(12) United States Patent
Wang

(10) Patent No.: US 11,048,219 B2
(45) Date of Patent: Jun. 29, 2021

(54) AUTOMATION MANAGEMENT INTERFACE USING TOUCH-ACTIVATED DISPLAY TEMPLATES DIFFERENTIATED BY MODE OF DATA FEATURES DETERMINED BY DATA POPULATING THE DISPLAY

(71) Applicant: BEET, Inc., Plymouth, MI (US)

(72) Inventor: David Jingqiu Wang, Northville, MI (US)

(73) Assignee: BEET, INC., Troy, MI (US)

( * ) Notice: Subject to any disclaimer, the term of this patent is extended or adjusted under 35 U.S.C. 154(b) by 226 days.

(21) Appl. No.: 15/306,959

(22) PCT Filed: May 8, 2015

(86) PCT No.: PCT/US2015/029928
§ 371 (c)(1),
(2) Date: Oct. 26, 2016

(87) PCT Pub. No.: WO2015/172048
PCT Pub. Date: Nov. 12, 2015

(65) Prior Publication Data
US 2017/0052518 A1      Feb. 23, 2017

Related U.S. Application Data

(63) Continuation-in-part of application No. 14/705,421, filed on May 6, 2015, now Pat. No. 10,048,670.
(Continued)

(51) Int. Cl.
*G05B 19/048*        (2006.01)
*G05B 23/02*         (2006.01)
(Continued)

(52) U.S. Cl.
CPC ............ *G05B 19/048* (2013.01); *G05B 11/01* (2013.01); *G05B 19/0423* (2013.01);
(Continued)

(58) Field of Classification Search
None
See application file for complete search history.

(56) References Cited

U.S. PATENT DOCUMENTS 7,539,597 B2 * 5/2009 Wegerich ........... G05B 23/0254
                                                700/108
9,369,820 B2 * 6/2016 Jan .................... H04M 1/72527
(Continued)

FOREIGN PATENT DOCUMENTS

EP         2728427 A1    5/2014

OTHER PUBLICATIONS

Greenfield, David. Diagnostic Intelligence, Mar. 1, 2012. www.automationworld.com [online], <URL https://www.automationworld.com/diagnostic-intelligence> (Year: 2012).*
(Continued)

*Primary Examiner* — Kenneth M Lo
*Assistant Examiner* — Jonathan Michael Skrzycki
(74) *Attorney, Agent, or Firm* — Quinn IP Law

(57) ABSTRACT

A system and method for controlling automation includes a machine performing at least one operation and including a sensor for generating data in response to a performance of the operation by the machine. Data generated by the sensor is stored for retrieval by a server in data memory storage. The server includes at least one display template for displaying the data, and the server generates a data display by populating the at least one display template with the data. The data template can be populated with data in real time, to display the data display immediate to the generation of the data. The display template includes a data feature which is differentiated for displaying the data feature in a mode determined by the data populating the data display. The data display can be displayed in real time by a user device in communication with the server.

13 Claims, 18 Drawing Sheets

Related U.S. Application Data

(60) Provisional application No. 61/990,159, filed on May 8, 2014, provisional application No. 61/990,169, filed on May 8, 2014, provisional application No. 61/990,163, filed on May 8, 2014, provisional application No. 61/990,172, filed on May 8, 2014, provisional application No. 61/990,148, filed on May 8, 2014, provisional application No. 61/990,151, filed on May 8, 2014, provisional application No. 61/990,156, filed on May 8, 2014, provisional application No. 61/990,170, filed on May 8, 2014, provisional application No. 61/990,148, filed on May 8, 2014, provisional application No. 61/990,158, filed on May 8, 2014.

(51) Int. Cl.
  *G05B 11/01* (2006.01)
  *G05B 19/418* (2006.01)
  *G05B 19/409* (2006.01)
  *G05B 19/042* (2006.01)

(52) U.S. Cl.
  CPC ....... *G05B 19/0426* (2013.01); *G05B 19/409* (2013.01); *G05B 19/418* (2013.01); *G05B 19/4183* (2013.01); *G05B 23/0216* (2013.01); *G05B 23/0272* (2013.01); *G05B 2219/25387* (2013.01); *G05B 2219/25407* (2013.01); *G05B 2219/31368* (2013.01); *G05B 2219/31472* (2013.01); *G05B 2219/35472* (2013.01); *G05B 2219/39447* (2013.01); *Y02P 80/10* (2015.11); *Y02P 90/02* (2015.11)

(56) References Cited

U.S. PATENT DOCUMENTS

| | | | | |
|---|---|---|---|---|
| 2003/0139905 A1* | 7/2003 | Helsper | .............. | G06F 11/3006 702/182 |
| 2009/0164933 A1* | 6/2009 | Pederson | ............. | G05B 19/409 715/772 |
| 2011/0035693 A1 | 2/2011 | Ueno et al. | | |
| 2012/0062577 A1 | 3/2012 | Nixon | | |
| 2012/0079407 A1 | 3/2012 | Holmes et al. | | |
| 2012/0143378 A1* | 6/2012 | Spears | ................. | H04L 12/282 700/275 |
| 2012/0310865 A1* | 12/2012 | Wang | ................. | G06F 11/3006 706/12 |
| 2014/0129002 A1* | 5/2014 | Brandes | ............. | G05B 19/0426 700/83 |
| 2014/0135947 A1* | 5/2014 | Friman | .............. | G05B 23/0267 700/29 |
| 2015/0066434 A1* | 3/2015 | Ogawa | ............... | G05B 19/4063 702/187 |
| 2015/0105887 A1* | 4/2015 | Troy | ................. | G05B 19/41865 700/97 |

OTHER PUBLICATIONS

Greenfield, David. Motion and Control: The heartbeat of automation, Mar. 19, 2013. www.automationworld.com [online], <URL https://www.automationworld.com/motion-and-control-heartbeat-automation> (Year: 2013).*

Definition of screen. Retrieved from the Internet on Jan. 29, 2020. URL<https://www.merriam-webster.com/dictionary/screen (Year: 2020).*

Definition of display. Retrieved from the internet on Jan. 29, 2020. URL <https://www.merriam-webster.com/dictionary/display> (Year: 2020).*

Definition of sensor. Retrieved from the internet on Jan. 29, 2020. URL to <https://www.merriam-webster.com/dictionary/sensor> (Year: 2020).*

Windows XP. Retrieved from the internet on Jan. 29, 2020. URL <https://vaaju.com/ukraineeng/windows-xp-has-finally-gone-down-in-history/> (Year: 2020).*

* cited by examiner

AUTOMATION MANAGEMENT INTERFACE USING TOUCH-ACTIVATED DISPLAY TEMPLATES DIFFERENTIATED BY MODE OF DATA FEATURES DETERMINED BY DATA POPULATING THE DISPLAY

CROSS-REFERENCE TO RELATED APPLICATIONS

This Application claims the benefit of PCT Application PCT/US2015/029928 filed May 8, 2015, U.S. application Ser. No. 14/705,421 filed May 6, 2015, U.S. Provisional Application 61/990,148 filed May 8, 2014, U.S. Provisional Application 61/990,151 filed May 8, 2014, U.S. Provisional Application 61/990,156 filed May 8, 2014, U.S. Provisional Application 61/990,158 filed May 8, 2014, U.S. Provisional Application 61/990,159 filed May 8, 2014, U.S. Provisional Application 61/990,163 filed May 8, 2014, U.S. Provisional Application 61/990,169 filed May 8, 2014, U.S. Provisional Application 61/990,170 filed May 8, 2014, and U.S. Provisional Application 61/990,172 filed May 8, 2014, which are each hereby incorporated by reference in their entirety.

TECHNICAL FIELD

The present disclosure relates generally to operating and managing automated equipment, including collecting and capturing automation data using an automation controller in communication with a computing device.

BACKGROUND

A facility may include multiple machines. Each machine can be controlled by a programmable logic controller (PLC) or similar controller connected to multiple machine elements, power sources and sensors of the machine. The controller in communication with the sensors receives sensor inputs to the controller indicating condition states of the various elements. The controller may be programmed to scan at a predetermined frequency through a scan cycle, defined for example, by a sequence of operations (SOP) to be performed by the elements of the machine, and, based on the sensor inputs and condition states received by the controller, selectively energize the power sources to actuate the elements to perform operations defined by the program. Each machine and its associated controller may be operated independently from each other machine. Some processes use manually controlled tools, such as pneumatic torque wrenches, where consolidation of process data may be difficult. When the inputs provided by each controller of the independent machines are not consolidated for analysis, interactions between machines, zones and production lines, and related opportunities to increase facility efficiency and decrease facility downtime can be missed.

SUMMARY

An automated operating system (AOS) is provided which accumulates data and inputs from various elements, machines, and facilities of an enterprise operating the AOS, and/or over various operating time periods, and analyzes the accumulated data and inputs using a server to identify issues, trends, patterns, etc. which may not be identifiable by independent machine controllers of the machines in the enterprise, for example, where such issues may result from interactions of multiple inputs which are outside the scope of inputs controlled by or analyzed by any individual one of the machine controllers, and/or which may be identifiable only by a combination of inputs from multiple machine, multiple time periods such as operating shifts, and/or by a combination of inputs to determine cumulative issues within a production line, a zone, a group of common elements or common machines, etc. The AOS can be used to identify, to initiate responses to, to manage and/or to prevent issues using the collective resources of the enterprise in which the AOS operates. The AOS described herein is advantaged by the capability to generate a plurality of differently configured data displays generated from a plurality of corresponding display templates populated with real time data which can be displayed to a user in real time, on a user interface of a user device, to allow real time monitoring of the operation, machine, etc. defining the data display being viewed by the user. Differentiation of certain data features of the data display provides immediate visual recognition by the user/view of the condition state and/or alert status of a differentiated data feature. The differentiated data feature may be visually differentiated, for example, by color, pattern, font, lighting, etc. for efficient viewing. The data display may be activated by a touch input to the touch screen to display additional information, for example, in a pop-up window, for convenient and real time viewing by the user/viewer.

In one example, a system and method for controlling automation using the AOS includes a machine performing at least one operation. The machine includes at least one sensor for generating data in response to a performance of the operation by the machine. A data memory storage receives and stores the data generated by the at least one sensor such that the data can be retrieved by a server in communication with the data memory storage. The data is associated in the data memory storage with the operation, the machine, and a data time. In one example, the data time associated with the data is one of a time the at least one sensor sensed the data and a time the data was stored to the data memory storage. The server includes at least one display template for displaying the data, and the server generates a data display by populating the at least one display template with the data. The display template includes at least one data feature which comprises a differentiator, such as a color indicator, for displaying the at least one data feature in a mode which is one of a first mode and at least a second mode. The mode is determined by the data populating the data display. The data feature can be defined by the operation performed by the machine. The system further includes at least one user device including a user interface, where the user device in communication with the network receives and displays the data display. The user interface can be a touch interface for receiving a touch input from a user, where a touch input to a touch activated user interface element (UIE) defined by the display template allows a user to manipulate the data display.

In use, the server populates the at least one display template with the data in real time to generate the data display in real time, and such that the at least one data feature is differentiated in real time as determined by the data populating the data display and such that the user device displays the data display in real time. In one example, the data defined by the performance of the operation includes at least one of a condition state of the operation and an operating parameter of the operation, and the at least one of the condition state and the operating parameter is sensed by the at least one sensor during the performance of the operation.

In one example, the operation performed by the machine to generate data collected by the server is characterized by a baseline cycle, such that the sensor senses an actual cycle of the operation and generates data defined by the actual cycle of the operation in real time to populate a display template which includes a sequence of operations (SOP) including the operation performed by the machine, a baseline cycle time indicator for displaying the baseline cycle of the operation, and an actual cycle time indicator for displaying the actual cycle of the operation. The actual cycle time indicator is populated with the data generated by the sensor and in one example, the actual cycle time indicator is differentiated as determined by a comparison of the actual cycle time to the baseline cycle time of the operation. In one example, the display template displays the baseline cycle indicator and the actual cycle indicator in an SOP timeline display. In another example, the display template displays the baseline cycle indicator and the actual cycle indicator in a heartbeat timeline display.

The above features and advantages, and other features and advantages, of the present teachings are readily apparent from the following detailed description of some of the best modes and other embodiments for carrying out the present teachings, as defined in the appended claims, when taken in connection with the accompanying drawings.

DETAILED DESCRIPTION

Figure 1:
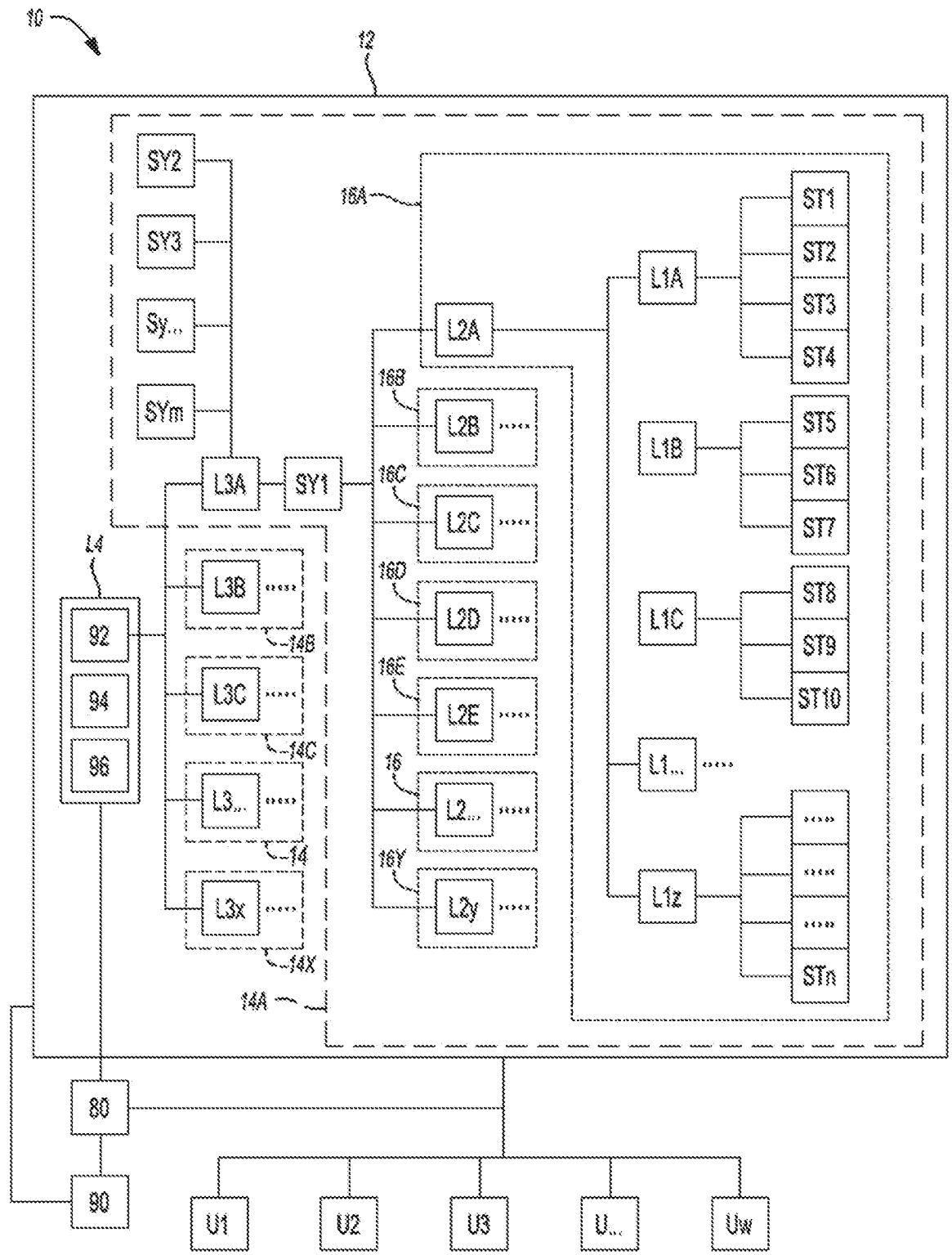
FIG. 1 is a schematic view of an example of an automation operating and management system including first, second, third and fourth level controllers.

Referring to the drawings wherein like reference numbers represent like components throughout the several figures, the elements shown in FIGS. 1-13 are not to scale or proportion. Accordingly, the particular dimensions and applications provided in the drawings presented herein are not to be considered limiting. FIG. 1 shows an automation operating and management system 10 for controlling systems, machines, and elements operating within an enterprise 12. The automation operating and management system 10 may be referred to herein as an automation operating system (AOS). The enterprise 12 includes an enterprise server L4, which may also be referred to herein as a fourth layer server, for receiving and consolidating data from multiple facilities 14 (shown in the example of FIG. 1 as facilities 14A . . . 14x and referred to herein collectively as facilities 14) within the enterprise 12. Each of the facilities 14 includes a facility server L3, which may also be referred to herein as a third layer server, for receiving and consolidating data from multiple facility systems SY (shown in the example of FIG. 1 as systems SY1 . . . SYm and referred to herein collectively as systems SY) within each of the facilities 14. Each facility server L3 is in communication with the enterprise server L4. At least one of the facility systems SY in each of the facilities 14 (shown in the example of facility 14A as system SY1) includes multiple machines 16 (shown in the example of FIG. 1 as machines 16A . . . 16y and referred to herein collectively as machines 16). The machines 16 can be any machines that perform coordinated operations including automated machines. In an illustrative and non-limiting example described herein the machines 16 can be machines such as automated machines performing operations in a manufacturing plant and/or an assembly facility. The enterprise server L4 can be embodied as one or more computer devices having a processor 94 and a memory 92, some of which is computer-readable tangible, non-transitory memory arranged on a printed circuit board or otherwise available to the processor 94. Instructions embodying the methods described herein may be programmed into memory 92 and executed as needed via the processor 94 to provide functionality of the AOS 10 as described herein. The memory 92 may include, by way of example, sufficient read only memory (ROM), optical memory, flash or other solid state memory, and the like. Transitory memory such as random access memory (RAM) and electrically-erasable programmable read-only memory (EEPROM) may also be included, along with other required circuitry (not shown), including but not limited to a high-speed clock, analog-to-digital (A/D) circuitry, digital-to-analog (D/A) circuitry, current/voltage/temperature/speed/position sensing circuitry, a digital signal processor, and any necessary input/output (I/O) devices and other signal conditioning and/or buffer circuitry. The enterprise server L4 can include a communications interface 96 for communication with other controllers and/or servers in the enterprise 12, including for example, for communication with each of a third layer server L3, a second layer controller L2 and a first layer controller L1 of the enterprise 12. The fourth layer (enterprise) server L4, third layer servers L3, second layer controllers L2 and first layer controllers L1 can be in communication with each other via a network 80, which may be a wired or wireless network.

AOS 10 can include a data storage memory 90 which can be used to store data received from one or more of the fourth layer server L4, third layer servers L3, second layer controllers L2 and first layer controllers L1. By way of example, the data storage memory 90 may be accessed via the network 80 and/or may be external to the enterprise 12, for external data storage. The data storage memory 90 can be accessible via the enterprise server L4 and/or via the network 80. The data storage memory 90 can include, by way of example, sufficient read only memory (ROM), optical memory, flash or other solid state memory, and the like to store data received from the enterprise 12. Transitory memory such as random access memory (RAM) and electrically-erasable programmable read-only memory (EEPROM) may also be included, along with other required circuitry (not shown), including but not limited to a high-speed clock, analog-to-digital (A/D) circuitry, digital-to-analog (D/A) circuitry, a digital signal processor, and any necessary input/output (I/O) devices and other signal conditioning and/or buffer circuitry. The example shown in FIG. 1 is non-limiting, and it would be understood that the data storage memory 90 can comprise a distributed memory network, for example, including memory 92 of the enterprise server L4, memory (not shown) of one or more of the facility servers L3, etc., which can be accessed as part of the data storage memory 90, for example, via the network 80.

AOS 10 can further include one or more user devices (shown in the example of FIG. 1 as user devices U1 . . . Uw and referred to herein collectively as user devices U) in communication with the enterprise 12, via a wired connection or a wireless connection, for example, via the network 80. By way of non-limiting example, a user device U can be a computing device such as a personal computer, tablet, laptop, smart phone, personal digital assistant, or other personal computing device for viewing information including data related to and/or provided by the enterprise 12. In one example, the user device U can display a machine control interface for one or more of the machines 16. The user device U can include a user interface 74 such as a touch screen for interacting with the information and data of the enterprise 12 and/or for controlling the machine 16 via the machine control interface.

In the example shown, each of the machines 16 includes a second layer controller L2 and one or more first layer controllers L1. Each of the machine controllers L2 (shown in the example of FIG. 1 as machine controllers L2A . . . L2y and referred to herein collectively as machine controllers L2) within a respective facility 14 are in communication with the respective facility controller L3 for that facility 14. A second layer controller L2 may also be referred to herein as a machine controller. Each machine controller L2 of a respective machine 16 is in communication with the first layer controllers L1 of that respective machine. A first layer controller L1 may be referred to herein as a base layer controller. The machine controllers L2 and the base layer controllers L1 can each perform specific functions in controlling and monitoring the operation of the machine 16. Each machine controller L2 and each base layer controller L1 can be embodied as one or more computer devices having a processor and memory, some of which is computer-readable tangible, non-transitory memory arranged on a printed circuit board or otherwise available to the processor. Instructions may be programmed into the memory of each of the machine controllers L2 and each of the base layer controllers L1 and executed as needed via the processor of the respective controller L2, L1 to provide the control functionality over the machines 16 and/or elements E within the control of each respective machine controller L2 and/or each respective base layer controller L1. The memory of each machine controller L2 and each base layer controller L1 can include, by way of example, sufficient read only memory (ROM), optical memory, flash or other solid state memory, and the like. Transitory memory such as random access memory (RAM) and electrically-erasable programmable read-only memory (EEPROM) may also be included, along with other required circuitry (not shown), including but not limited to a high-speed clock, current/voltage/temperature/speed/position sensing circuitry, analog-to-digital (A/D) circuitry, digital-to-analog (D/A) circuitry, a digital signal processor, and any necessary input/output (I/O) devices and other signal conditioning and/or buffer circuitry. Each machine controller L2 and each base layer controller L1 can include one or more monitoring, measuring and/or control devices for monitoring, measuring and/or controlling the machines 16 and/or elements E within the control of each respective machine controller L2 and/or each respective base layer controller L1.

Figure 2:
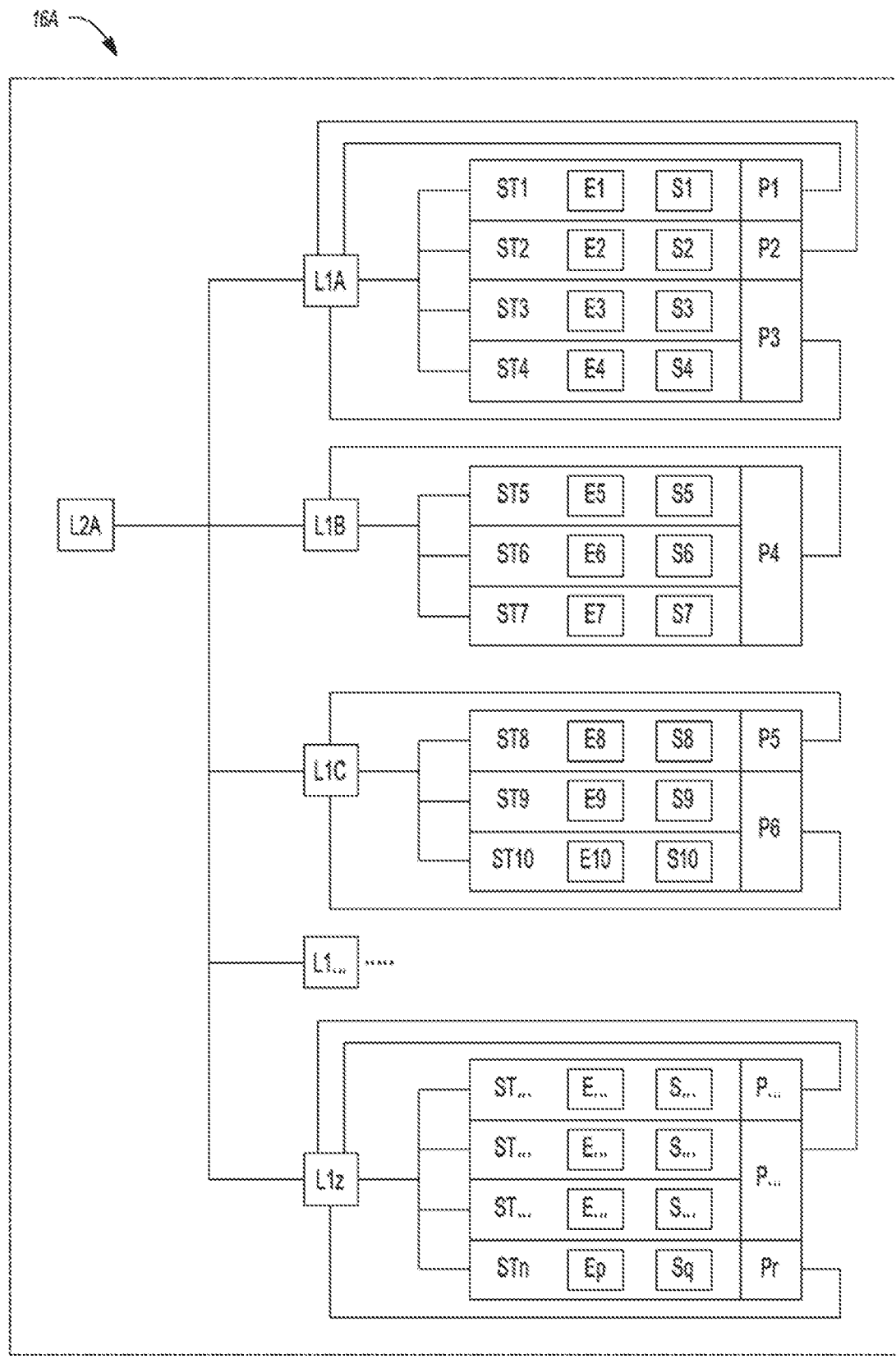
FIG. 2 is a schematic view of an example of a machine including a first level controller and a second level controller.

Each machine 16 includes a plurality of stations ST (shown in the example of FIGS. 1 and 2 as stations ST1 . . . STn and referred to herein collectively as stations ST) for performing an operational cycle of the machine 16, where the operational cycle includes operations of the machine 16 performed in a predetermined sequence controlled by the base layer controller L1 and/or the machine controller L2 of the machine 16. The predetermined sequence in which the operations in the operational cycle is performed can be defined by a sequence of operations 39 and/or a portion of a sequence of operations 39 defined for that machine 16 by the machine controller L2 of the machine 16. It would be understood that the machine 16 would, in operation, repeatedly perform the operational cycle comprising the sequence of operations 39 under control of the machine controller L2 and/or the base layer controller L1.

Each of the base layer controllers L1 (shown in the example of FIGS. 1 and 2 as base layer controllers L1A . . . L1z and referred to herein collectively as the base layer controllers L1) controls operations performed by at least one of the stations ST in communication with the respective base layer controller L1. As shown in FIG. 2, each station ST includes one or more elements E (shown in the example of FIG. 2 as elements E1 . . . Ep and referred to herein collectively as elements E), for performing various operations and/or tasks of the respective station ST. Using an illustrative example of a manufacturing and/or assembly enterprise 12, examples of elements E used to perform the various operations of a manufacturing and/or assembly operation performed by a machine 16 and/or station ST can include clamps, cylinders, collets, pins, slides, pallets, etc., where the examples provided herein are non-limiting.

Each station ST further includes one or more power sources P (shown in the example of FIG. 2 as power sources P1 ... Pr and referred to herein collectively as power sources P), for providing power to one or more elements E and for selectively energizing a respective element E in response to a signal from the base layer controller L1. Each station ST further includes one or more sensors S (shown in the example of FIG. 2 as sensors S1 ... Sq and referred to herein collectively as sensors S), for sensing a state of at least one of the elements E and the power source P of the station ST and providing an input to the base layer controller L1 indicating the state sensed by the sensor S.

A state, which may be referred to as a condition state or as a condition, as used herein, refers to a state of the object, a condition, a status, a parameter, a position, or other property being monitored, measured and/or sensed. Non-limiting examples of condition states including cycle start time, cycle stop time, element start time, element travel, element stop time, position of an element or object, a dimensional measurement or parameter of an object which can include a dimensional measurement of a feature of an element E, a feature of a machine 16, a feature of a workpiece (not shown) to which an operation is being performed by a machine 16 or an element E, a condition of one or more of an element E, machine 16 or workpiece, or a condition of the environment within the facility 14. A condition state could further include for example, operating conditions such as on, off, open, closed, auto, manual, stalled, blocked, starved, traveling, stopped, faulted, OK, good, bad, in tolerance, out of tolerance, present, not present, extended, retracted, high, low, etc., and can include for example, a measure of a physical property such as chemistry, temperature, color, shape, position, dimensional conditions such as size, surface finish, thread form, a functional parameter such as voltage, current, torque, pressure, force, etc., such that it would be understood that the terms state, condition, condition state and/or parameter as describing inputs to the AOS 10 are intended to be defined broadly. By way of non-limiting example, a sensor S may be configured as a limit switch, a proximity switch, a photo eye, a temperature sensor, a pressure sensor, a flow switch, or any other type of sensor which may be configured to determine if one or more states are met during operation of the automated system 10, to sense one or more parameters during operation of the automated system 10, and to provide an output to the at least one automation controller, such as the base layer controller L1 and/or the machine layer controller L2, which is received by the controller L1, L2 as an input corresponding to the state determined by the sensor S. The sensor S output may be configured, for example, as a signal provided to the base layer controller L1 and/or to the machine layer controller L2, and received by the base layer controller L1 and/or to the machine layer controller L2 as an input including input data. The sensor S may be configured to provide a discrete or bit-form output. The sensor S may be configured as an analog sensor and may provide an analog output signal corresponding to one or more of multiple states of a element E or a group of elements E associated with the sensor S, or one or more of multiple states of an environment of the machine 16 and/or the environment of the facility 14 including the machine 16. The sensor inputs and/or input data received by controllers L1 and L2 can be communicated, for example, via controller L2, to one or more of the servers L3 and L4 and/or stored in data storage memory 90.

The predetermined sequence of operations in the operational cycle can be defined by a sequence of operations 39 and/or a portion of a sequence of operations 39 defined for that machine 16 by the machine controller L2 of the machine 16. In one example, the machine controller L2 can perform the functions of the machine controller L2 and the base layer controllers L1, such that the machine 16 can be configured without the base layer controllers L1. In this example, the machine 16 would, in operation, repeatedly perform the operational cycle comprising the sequence of operations 39 under the independent control of the machine controller L2.

In another example, the controller functions may be divided between the base layer controllers L1 and the machine controller L2, with the base layer controllers L1 functioning as low level controllers and the machine controllers L2 functioning as a high level controller coordinating the operation of the base layer controllers L1 within the machine 16. In this example, the machine 16 would, in operation, repeatedly perform the operational cycle comprising the sequence of operations 39 under the control of the machine controller L2 and the base layer controllers L1, where the machine controller L2 acts as a data collector collecting the condition state data for each of the elements E of the machine 16 from each of the respective base layer controllers L1, and acts as a local area controller to coordinate and control the interaction of the base layer controllers L1 with each other. In this example, each base layer controller L1 within the machine 16 is in communication with each other base layer controller L1 within the machine 16 and with the machine controller L2 to communicate condition states of each of the elements E controlled by that respective base layer controller L1, such that each base layer controller L1 can execute control actions of the respective elements E under the control of the respective base layer controller L1 in response to the condition state data received from the other base layer controllers L1 in the machine 16.

For illustrative purposes and by way of non-limiting example, the enterprise 12 shown in FIGS. 1 and 2 may be a production enterprise including a plurality of manufacturing and/or assembly facilities 14, such as facilities 14A, 14B and 14C. In one example, the facilities 14A, 14B and 14C may be co-located within the production enterprise 12, for example, each of the facilities 14A, 14B and 14C may be sub-factories or assembly lines co-located in a larger building defining the production enterprise 12. In another example, each of the facilities 14A, 14B and 14C may be a stand-alone factory which may be geographically separated from each other and in communication with each other and the enterprise server 12, for example, via the network 80. Facility 14A, for illustrative purposes, is shown in additional detail in FIGS. 1 and 2, and includes a facility server L3A which is in communication with multiple systems SY such as systems SY1, SY2 and SY3 operating in the facility 14A. In the example shown, system SY1 includes manufacturing and/or assembly operations consisting of multiple machines 16 such as machines 16A, 16B, 16C, 16D and 16E.

In the illustrative example, machine 16A is shown in additional detail in FIG. 2, consisting of multiple stations ST such as stations ST1 through ST10. Machine 16A includes a machine controller L2A in communication with multiple base layer controllers L1 such as base layer controllers L1A, L1B and L1C. Each of the base layer controllers L1A, L1B and L1C acts to control multiple stations ST according to instructions received from the machine controller L2A, to perform operations, for example, defined by a sequence of operations 39 stored in the machine controller L2A. For example, as shown in FIG. 2, base layer controller L1A can control the operations of stations ST1, ST2, ST3, ST4 by selectively activating the power sources P1, P2 and P3 to selectively actuate elements E1, E2, E3 and E4. The base layer controller L1A receives sensor outputs from the sensors S1, S2, S3 and S4 which indicate condition states, for example, of the elements E1, E2, E3 and E4. The base layer controller L1A is in communication with base layer controllers L1B and L1C in the present example, and receives condition state input from base layer controllers L1B and L1C indicating the condition states of elements E5 through E10. The base layer controller L1A selectively actuates the elements E1, E2, E3 and E4 according to instructions stored in the memory of the base layer controller L1A, inputs and instructions received from the machine controller L2A and in response to the condition states of the elements E1 through E10, in the present example, received by the base layer controller L1A. The examples described herein and shown in FIGS. 1 and 2 related to machine 16A are illustrative and non-limiting. For example, each of the machines 16 controlled and/or managed by AOS 10 could include a machine controller L2, however could differ in including a base layer controller L1 and/or the number of base layer controllers L1 included in the machine 16, and could differ in the number, arrangement, function, etc. of the stations ST, elements E, sensors S and power sources P from the illustrative example of machine 16A shown in FIGS. 1 and 2.

In the present illustrative example, facility systems SY2 and SY3 shown in FIGS. 1 and 2 can operate in the facility 14A and can be operated and/or managed using the AOS 10 in a manner and/or to provide outputs which can affect the operations of system SY1 in facility 14A, including affecting the efficiency and/or downtime of the machines 16 included in the system SY1. Each of the systems SY2, SY3 includes one or more servers (not shown, referred to herein as a SY server) which can be embodied as one or more computer devices having a processor and memory, some of which is computer-readable tangible, non-transitory memory arranged on a printed circuit board or otherwise available to the processor. Instructions may be programmed into the memory of each SY server and executed as needed via the processor of the SY server to provide monitoring and/or control functionality over the facility operations within the control of the respective SY system. The memory of the SY server can include, by way of example, sufficient read only memory (ROM), optical memory, flash or other solid state memory, and the like. Transitory memory such as random access memory (RAM) and electrically-erasable programmable read-only memory (EEPROM) may also be included, along with other required circuitry (not shown), including but not limited to a high-speed clock, current/voltage/temperature/speed/position sensing circuitry, analog-to-digital (A/D) circuitry, digital-to-analog (D/A) circuitry, a digital signal processor, and any necessary input/output (I/O) devices and other signal conditioning and/or buffer circuitry. Each of the systems SY2, SY3 can include one or more monitoring, measuring and/or control devices and/or sensors for monitoring, measuring and or sensing a state of the facility operations within the control of the respective SY system.

In the present illustrative example of a production enterprise 12, system SY2 can be a facility management system, which may be referred to herein as a facility infrastructure system SY2, for monitoring, measuring and/or controlling various factors of the infrastructure and operating environment of facility 14A, such as electrical power supply provided to the various power sources P, water supply provided to hydraulic and/or coolant systems within the facility 14A and/or coolant systems related to the machines 16, compressed air supply provided within the facility 14A, for example, to pneumatic systems of the machines 16, to pneumatically operated elements E, and/or to pneumatically controlled manual tools such as pneumatic torch wrenches which may be used in manufacturing and/or assembly operations within the facility 14A. It would be understood that variability in each of the electrical power supply, water supply, and compressed air supply could affect the operation, efficiency and downtime of one or more of the machines 16 and/or elements E. For example, a decrease in the pressure of the compressed air supply provided to a pneumatically controlled element E such as a cylinder may decrease the speed at which the cylinder element E travels, increasing the cycle time required for the cylinder element E to travel when performing an operation of a machine 16. For example, an increase in temperature of cooling water circulating in a cooling water jacket of a machine 16 such as a welding machine, may change the efficiency of heat transfer from a work area of the machine 16, affecting the tool life of the welding elements E in the machine 16 and/or the cooling rate of the welds being formed in a product welded by the machine 16. For example, variability in the voltage level of the incoming power supply provided to a power source P can affect the response time of a clamp element E activated by the power source P, thereby affecting the cycle time of the operation performed by the clamp element E. By way of example, system SY2 can monitor, measure, and/or control ambient conditions within the facility 14A, or within a portion of the facility 14A, such as temperature, humidity, etc. For example, the facility 14A may be portioned into multiple zones 98 such as zones 98A, 98B, 98C shown in FIG. 9, where at least one of the machines 16 is located in each zone. By way of example, one of the zones 98A, 98B, 98C can include machines 16 which are performing operations sensitive to ambient temperature and/or humidity conditions, such as an electronics fabrication operation or a painting operation, such that variability in the ambient temperature and/or humidity in that zone may affect the quality of the product produced by the machines 16 in that area. These examples are non-limiting and for illustrative purposes, and it would be understood that variability within facility controlled systems and conditions such as power supply, water supply, compressed air supply, temperature, humidity, etc. can affect the operation of the machines 16, elements E and/or can affect the quality and/or condition of the products produced by and/or the services provided by the machines 16 in multiple ways too numerous to include herein. System SY2 can transmit signals (inputs) to the facility server L3A indicating condition states of the various factors of the operating environment of facility 14A being monitored, measured, and/or controlled by the facility server L3A.

In the present illustrative example of a production enterprise 12, system SY3 can include production control and product assurance operations and can monitor, measure and/or control various factors of the production control and product assurance operations which impact the operation of manufacturing and production system SY1 of facility 14A. For example, the production control operations of system SY3 can monitor inventory levels (on order, in transit, in stock) of machine parts for the machines 16, which may include replaceable service parts (motors, etc.) sensors S (limit switches, etc.) and/or elements E which can include durable (reusable) elements such as clamps, cylinders, etc. and/or consumable (replaceable) elements E such as drills, taps, clamp pads, etc. required for a station ST to complete an operation and/or for the machine 16 to operate. In another illustrative example, the production control operations of system SY3 can monitor inventory levels (on order, in transit, in stock) of vendor supplied (purchased) components and/or material which are provided to the machines 16, for example, as raw material or work pieces on which operations are performed by the machines 16, or are provided to the machines 16, for example, as components to be assembled with other components to form a finished assembly. The product assurance operation, for example, can monitor the condition of vendor supplier (purchased) components and/or materials and indicate the acceptance or rejection of the vendor supplied materials, which could affect the availability of that inventory to the machines 16. In another illustrative example, the product assurance operation can measure and output a condition state of a component or raw material to the facility server L3 and/or to a machine controller L2 of a machine 16 processing the component or raw material, such that the machine 16 in response can adjust settings based on the measured condition state of the incoming component or raw material. For example, a machine 16 may be an oven to temper components made from raw material. The machine 16 via the facility controller L3 can receive hardness data for the raw material from the product assurance system SY3 and adjust the tempering temperature of the oven based on the hardness of the raw material. These examples are non-limiting and for illustrative purposes, and it would be understood that the condition of components and/or raw material monitored and/or measured by the product assurance operations of the system SY3, the inventory levels of components and/or raw material and the availability of machine parts for the machines 16 and elements E controlled and monitored by the production control operations of the system SY3 can affect the operational efficiency and/or downtime of the machines 16 and/or elements E and/or can affect the quality and/or condition of the products produced by and/or the services provided by the machines 16 in multiple ways too numerous to include herein. System SY3 can transmit signals (inputs) to the facility server L3A indicating condition states of the various factors of the operating environment of facility 14A being monitored, measured, and/or controlled by the facility server L3A.

In the present illustrative example, the facility server L3A acts as a data collector within the AOS 10 for collecting the inputs received from the systems SY1, SY2 and SY3, and can analyze and use the accumulated data and inputs to identify and respond to operating conditions throughout the facility 14A, including implementing preventive actions to minimize downtime, efficiency losses and/or productivity losses, by controlling and modifying the operations within the facility 16A, which can include outputting commands to the machine controllers L2A through L2E and outputting commands to systems SY2 and SY3, for example, in response to condition states and inputs received from the machine controllers L2A through L2E and systems SY2 and SY3, to modify the operating conditions within the facility 14A, the sequence of operations 39 performed by the various stations ST, the machines 16 and/or stations ST used to perform one or more operations, etc., to improve efficiency, decrease and/or optimize power consumption within the facility, increase productivity, reduce or avoid downtime, etc. in response to the analysis of the data by the facility server L3A. The AOS 10 is advantaged by accumulating the data and inputs from multiple production (SY1) and non-production (SY2, SY3) systems and multiple machines within a facility 14, analyzing the accumulated data and inputs using a facility server L3 to identify issues which may not be identifiable by the independent machine controllers L2, for example where such issues may result from interactions of multiple inputs which are outside the scope of inputs controlled by any one of the machine controllers L2, and/or which may be identifiable only by combination of inputs from multiple sources (multiple machines 16, a machine 16 and system input from one or more of systems SY2, SY3, etc.), and using the AOS 10 to identify, action responses to, manage and/or prevent issues using the collective resources of the facility 14.

In the present illustrative example, the enterprise server L4 acts as a data collector for the inputs and data received from the facility servers L3A, L3B and L3C. The enterprise server L4 can analyze and use the accumulated data and inputs to control and modify the operations within one or more of the facilities 16A, 16B, 16C, 16D and 16E, including implementing preventive actions to minimize downtime, efficiency losses and/or productivity losses, by controlling and modifying the operations of one or more of the facilities 16A, 16B, 16C, 16D and 16E, in response to an issue or condition identified in one or more of the facilities 16A, 16B, 16C, 16D and 16E, which can include, for example, transferring production between facilities 16 in anticipation of or in response to a downtime event, to increase efficiency based on the operational condition of a machine 16 in one facility 14 as compared to an identical and/or substantially similar machine 16 in another facility 14, to respond to inputs received from the non-production systems SY2 and/or SY3 indicating for example, a facility power supply issue or incoming material issue, etc. The AOS 10 is advantaged by accumulating the data and inputs from facilities 14, analyzing the accumulated data and inputs using the enterprise server L4 to identify issues which may not be identifiable by the independent facility servers L3, for example where such issues may result from interactions of multiple inputs which are outside the scope of inputs controlled by or received into any one of the facility servers L3, and/or which may be identifiable only by a combination of inputs from multiple facilities L4, and using the AOS 10 to identify, action responses to, manage and/or prevent issues using the collective resources of the enterprise 12.

The examples described herein and shown in FIGS. 1 and 2 related to facility 14A are illustrative and non-limiting, and it would be understood that the facilities 14 other than facility 14A included in the enterprise 12 can each include at least one machine 16 configured similar to machine 16A to include a base layer controller L1 and a machine controller L2, however the number and configuration of each of the machines 16 may vary within a facility 14 and from one facility 14 to another facility 14, and each of the machines 16 may include elements E and sensors S arranged in stations ST other than those described for the example of machine 16A to perform operations other than those performed as described for machine 16A.

The example of an enterprise 12 including facilities 14 such as manufacturing plants and/or assembly facilities is not intended to be limiting. An AOS 10 as described herein can be applied to the control and management of any type of enterprise 12 including machines 16 performing coordinated operations, and as such it would be understood that the terms enterprise 12, facility 14, machine 16, element E and sensor S are intended to be defined broadly. By way of non-limiting example, an enterprise 12 can be an amusement park including an AOS 10, where the facilities 14 and machines 16 are defined by different areas of the amusement park and the systems SY can include, for example, a security system for the amusement park and an infrastructure system (water, power, waste disposal, etc.) of the amusement park. In such an example, an amusement ride facility 14A can include machines 16 forming the amusement rides, an admission ticketing facility 14B can include machines 16 for receiving and securing payment for tickets, a dining facility 14C can include machines 16 for providing food service, a parking facility 14C can include machines 16 for receiving parking fees and monitoring and patrolling the parking area, etc. In another non-limiting example, an enterprise 12 including an AOS 10 may be a property development, such as an office building complex, where each facility 14 includes one or more buildings within the complex, and the machines 16 operating in each facility 14 include, for example, elevators, security cameras, heating and ventilation equipment, etc.

Figure 3:
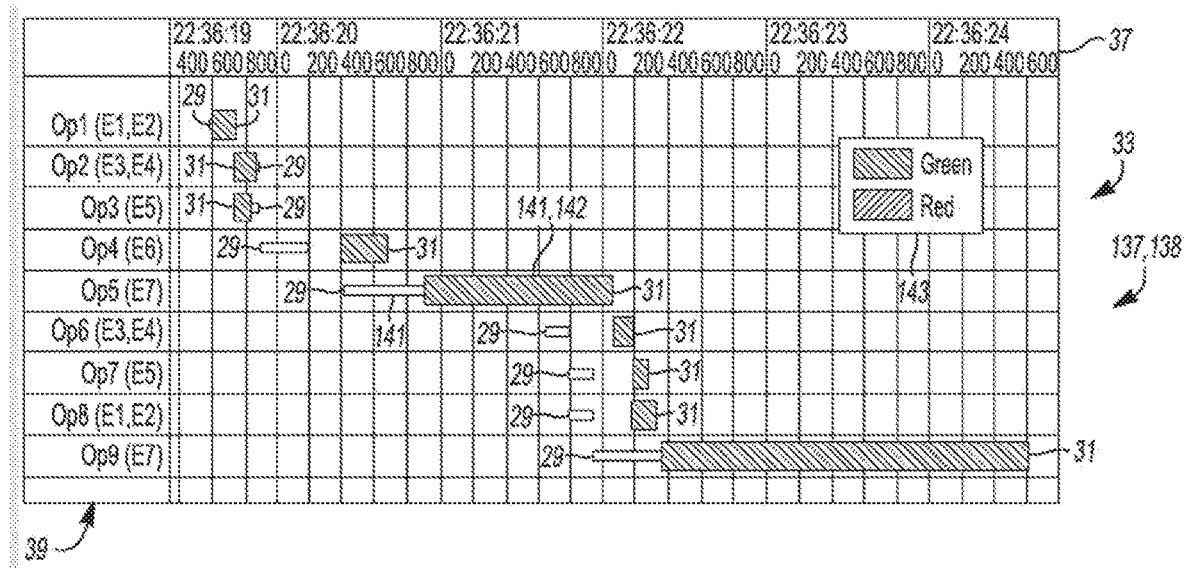
FIG. 3 is a schematic illustration of an example of a machine sequence of operations of a machine of the system of FIG. 1.
Figure 4:
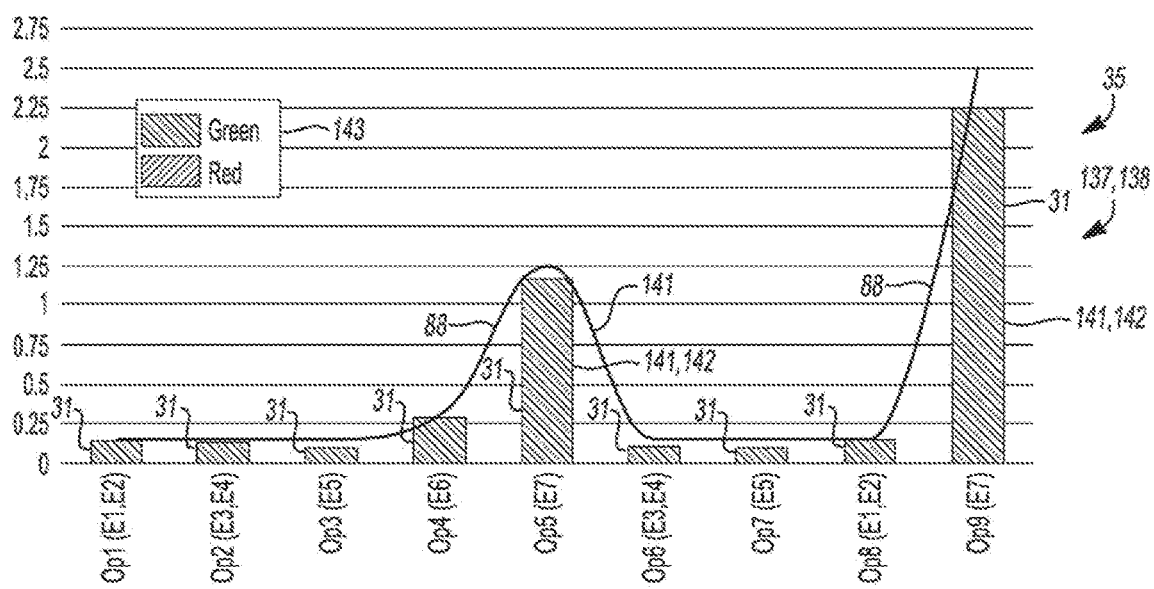
FIG. 4 is a schematic illustration of an example of a machine heartbeat of the sequence of operations of FIG. 3.

Referring now to FIGS. 3 and 4, timing data collected from one or more of the elements E, stations ST and/or machines 16 within the enterprise 12 can be displayed as shown in FIG. 3 in a traditional sequence of operation (SOP) display format 33, and/or in a heartbeat display format 35 shown in FIG. 4. In the SOP display 33 shown in FIG. 3, the sequence of operations 39 corresponding to the data being displayed is listed vertically (as shown on the page), and in the present example includes operations Op1 through Op9, with operation Op1 being performed by elements E1 and E2 of a machine 16, operation Op2 being performed by elements E3 and E4, and so on. A baseline cycle, e.g., the design intent cycle, for each of the operations Op1 . . . Op9 in the SOP 39 is graphically shown by a baseline cycle indicator 29. The actual cycle for each of the operations Op1 . . . Op9 is graphically shown by an actual cycle indicator 31. Each of the actual cycle indicators 31 may be color coded, e.g., displayed in a color defining the status of the cycle of that operation. In the example shown, the actual cycle indicators 31 are displayed in either a red or green color, with red indicating the actual cycle time is outside of a predetermined tolerance for the cycle of that operation, and green indicating the actual cycle time is within tolerance.

In the heartbeat display 35 shown in FIG. 4, the sequence of operations (SOP) 39 corresponding to the data is displayed on the horizontal axis (as shown on the page) with the actual cycle time of each operation Op1 . . . Op9 shown in heartbeat display format by an actual cycle time indicator 31, which may be color coded as previously described for FIG. 3, to indicate whether the cycle time for each respective operation is within tolerance. FIG. 4 further displays the heartbeat 88 of the sequence of operations, where the heartbeat 88 is determined, for example, as described in U.S. Pat. No. 8,880,442 B2 issued Nov. 14, 2014 to the inventor and incorporated by reference herein.

Figure 5:
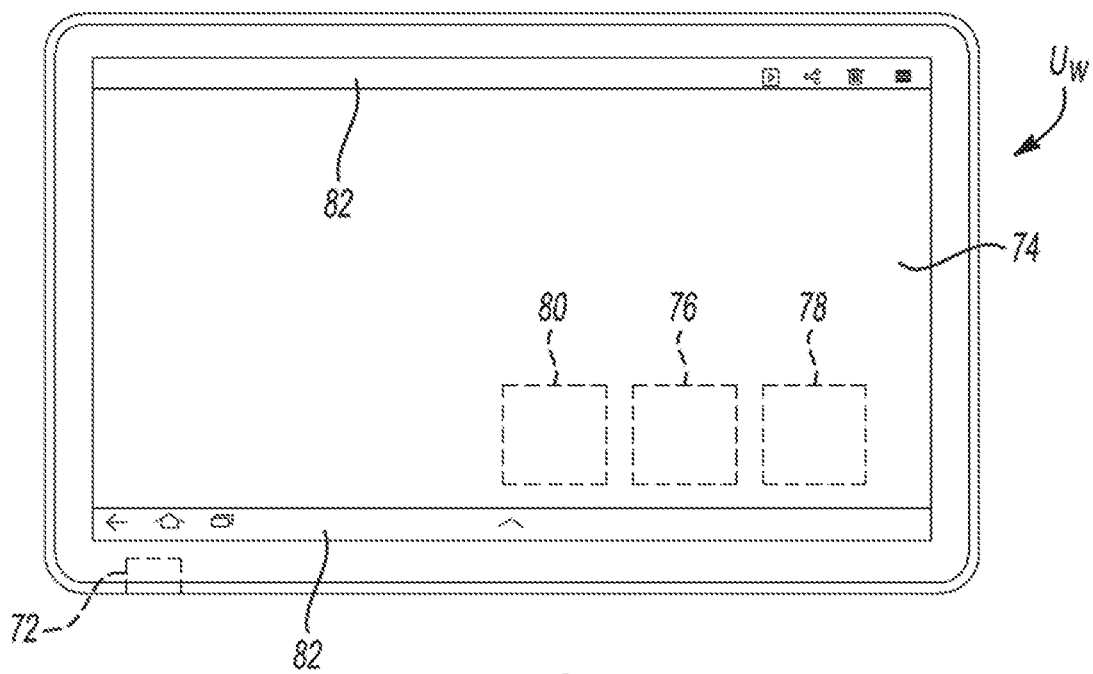
FIG. 5 is a schematic illustration of an example of a user device of FIG. 1.

The AOS 10 can include one or more user devices U (shown in the example of FIGS. 1 and 2 as user devices U . . . Uw and referred to herein collectively as user devices U) in communication with the data collected by the AOS 10, for example, via the network 80. In one example, the user device U can be a portable computing device such as a personal computer, notebook, tablet, smart phone, personal data assistant, etc., including, as shown in FIG. 5, a processor 76 and memory 78, some of which is computer-readable tangible, non-transitory memory arranged on a printed circuit board or otherwise available to the processor 76. The memory 78 may include, by way of example, sufficient read only memory (ROM), optical memory, flash or other solid state memory, and the like. Transitory memory such as random access memory (RAM) and electrically-erasable programmable read-only memory (EEPROM) may also be included, along with other required circuitry (not shown), including but not limited to a high-speed clock, location sensing circuitry, analog-to-digital (A/D) circuitry, digital-to-analog (D/A) circuitry, a digital signal processor, and any necessary input/output (I/O) devices and other signal conditioning and/or buffer circuitry. The user device U can include a connector port 72 for connecting the user device to another device (not shown). The user device U includes a communications interface which can be a wireless or wired interface, for connection of the user device U to the network 80 for communication with one or more of the controllers L1, L2, the servers L3, L4, another of the user devices U, and/or the data storage memory 90. The user device U includes a graphical user interface (GUI) 74, which in a preferred example is a graphical touch screen, such that a user can provide input to the user device U, including commands, via the touch screen 74 and/or standard tool bars 82. The graphical user interface 74 may also be referred to herein as a touch screen and/or as a user interface 74. In one example, the user may monitor the data collected from one or more of the elements E and/or machines 16 in the enterprise 12, which may be displayed on the user device U as a machine control interface, as described in U.S. patent application Ser. No. 14/705,421 filed May 6, 2015 by the inventor and incorporated by reference herein, where the machine control interface can be defined by one of the machine controller L2, the facility server L3 and/or the enterprise server L4. The machine control interface can be defined, at least in part, by a display template 137, such that the machine control interface can be as displayed on the user interface 74 can be a data display 138 as described herein. In one example, the user may subscribe to receive alerts for one or more elements E and/or machines 16 being monitored by the user, where the alerts may be received by the user on the user device U as one or more of a text message, instant message, e-mail, or other alert indicator.

FIGS. 3, 4, 5-6 and 10-20 show examples of data displays 138 which can be generated by a server, such as a facility server L3 and/or an enterprise server L4, for display on a user device U, by populating a display template 137 with data from AOS 10. In the examples shown in the figures, the display template 137 is shown populated with data, e.g., the display template 137 is illustrated by a data display 138 generated using the display template 137. In an illustrative example, the data display 138, such as any one of the data displays 138 shown in the figures, can be generated by the facility server L3 by populating a display template 137 with data collected from a machine 16 and/or data collected from a system SY, such as systems SY2, SY3, where the data is collected and stored to a memory, such as data memory storage 90, for use by the facility server L3 in generating the data display 138. A plurality of display templates 137 can be stored on data memory storage 90 and retrieved by the facility server L3 to generate a corresponding data display 138 in real time. The data memory storage 90 can be a standalone enterprise memory storage 90 as shown in FIG. 1, in communication with the enterprise 12 via a network 80, and/or can comprise memory storage within the enterprise 12. For example, data memory storage 90 can include memory 92 of enterprise server L4, and/or memory included one or more of the facility servers L3. Each display template 137 can be configured to display one or more data features 141, where a data feature 141 displays data collected from the machines 16 and/or systems SY. By way of illustrative example, a plurality of display templates 137 can be configured and stored in data memory storage 90 for use in generating a corresponding plurality of data displays 138. In one example, the plurality of display templates 137 can include one or more display templates 137 for displaying data of each of a machine 16, a group of machines 16, a production line, a zone 98 within a facility 14 including at least one machine 16, a group of zones 98 such as zones 98A, 98B, 98C shown in FIG. 9, a facility 14, a SOP 39 or a portion of an SOP 39, a manual tool or group of manual tools as shown in FIGS. 17-20, etc.

The data can include data generated by a sensor S, for example, by one of the sensors S1 . . . S10 shown in FIG. 2, where the data generated by the sensor S is generated in response to a performance of an operation Op which is performed by the machine 16. For example, data generated by the sensor S can include, as described herein, a condition state and/or an operating parameter of the operation performed by the machine 16, which may include a condition state and/or parameter of an element E, for example, a condition state and/or parameter of one of the elements E1 . . . E10 sensed by one of the sensors S1 . . . S10 as shown in FIG. 2. For example, data generated by the sensor S can include a condition state and/or a parameter of one or more stations ST of the machine 16 sensed by the sensor S, such as stations ST1 . . . ST10 shown in FIG. 2. Other data generated by the sensor S can include parameters of the machine 16 such as operating temperatures, pressures, cycle counts, current, voltage, etc. sensed by the sensor S. Data generated by the systems SY and stored to the data storage memory 90 for populating the display template 138 can include, by way of non-limiting example, an inventory level of a supplier part, a tool, a machine component, etc., a production count of units produced, units in process, etc., a condition status of material handling equipment or other facility infrastructure status, such as temperatures, humidity levels, etc. in various locations in the facility, an equipment status, etc.

The data is collected and stored to the data storage memory 90 in real time, such that the server, e.g., the facility server L3 in the present example, can populate a display template 137 to generate a data display 138 in real time. The term "in real time" as used herein refers to a level of responsiveness by computing equipment included in the enterprise 12, including, for example, base layer controllers L1, machine controllers L2, facility controllers L3, enterprise controller L4, data storage memory 90, user devices U, etc., which is perceived by a user as sufficiently immediate such that the response of the computing equipment in collecting and displaying data in a data display 138 is without delay, e.g., is perceived to occur at substantially the same time and at the same rate as the time and rate of the data being displayed. In the present example, data is collected from the sensors S and the systems SY in real time, e.g., without delay, such that the data can be populated into a display template 137 and displayed as a data display 138 on a user device U in real time, e.g., such that the data displayed on the data display 138 is displayed sufficiently immediate to the generation of that data by the originating source (for example, by a sensor S), that a user can view the data displayed in a data display 138 immediate to the time the data is generated and/or immediate to the time the event from which the data is generated occurs, for example, immediate to the time an operation is performed by a machine 16. Data, when collected and stored in the data memory storage 90, can be associated in the data memory storage 90, for example, in a data matrix provided for that purpose, with identifying information, which can include the source of the data such as the identification of the sensor generating the data, the condition state and/or the parameter represented by the data, e.g., the data feature 141 corresponding to the data, one or more of the operation Op, machine 16, element E, zone 98, facility 12, and/or system SY associated with the data, and a data time associated with the data. The data time associated with the data can be one of a time the data was generated, e.g., the time the data was sensed by a sensor generating the data, and a time the data was stored to the data memory storage. In real time, the time the data was sensed and the time the data was stored should be substantially equal as these events are immediate to each other in the real time system described herein. The example is non-limiting, and it would be understood that another time, such as a timestamp applied by a controller such as a base layer controller L1 or machine controller L2, can be used as the data time.

The display template 137 includes at least one data feature 141, where a data feature 141 may be defined by the type and origin of the data displayed by the data feature 141. For example, referring to FIG. 3 where the display template 137 shown in FIG. 3 generates a data display 141 configured as a sequence of operations (SOP) timeline display generally indicated at 33. The data display 141, in the present example configured as the SOP timeline display 33, includes a first data feature 141 which is a baseline cycle indicator 29 for displaying a baseline cycle of each of the operations Op1 . . . Op10 of the SOP 39 shown in FIG. 3. The SOP timeline display 33 includes a second data feature 141 which is an actual cycle indicator 31 for displaying an actual cycle of each of the operations Op1 . . . Op10. In the example shown, the SOP timeline display 33 can be generated by the facility server L3 in real time, such that the SOP timeline display 33 will continuously update the displayed data features 141 in real time as sensor data is generated by one of more sensors S sensing the condition state of elements E1 . . . E7 as the operations Op1 . . . Op9 are performed in real time. In this example, the actual time 37 is displayed and can be considered a data feature 141 of the SOP timeline display 33 at 37, such that a user viewing the data display 141 (the SOP timeline display 33 in the present example) would perceive the data updating in real time, to show the condition state of each operation Op1 . . . Op9 as sensed by a corresponding sensor S at the actual time 37 displayed on the data display 138. As shown in FIG. 3, at least one of the data features 141 can include a differentiator 142 to differentiate in data features in real time based on the data populating the display template 137 at that time. In the non-limiting example shown in FIG. 3, the second data feature 141, e.g., the actual cycle indicator 31, includes a differentiator 142 to differentiate the mode 143 of the actual cycle indicator 31 in real time. As shown in the example, actual cycle indicator 31 (the second data feature 141 in the present example) can be displayed in one of a "green" mode and a "red" mode, where the differentiator 142 in this example is the color (red or green) displayed by the actual cycle indicator 31. In this example, a data feature 141 displayed in "green" mode indicates the data feature 141 is in tolerance at the time the data display 138 is generated, and a data feature 141 displayed in "red" mode indicates the data feature 141 is out of tolerance at the time the data display 138 is generated. For example, as shown in FIG. 3 the actual cycle indicator 31 for operation Op5 is displayed in "green" mode to indicate that at the time the data display 138 was generated, e.g., at time "22:36:24 and 600 milliseconds" as indicated by actual time 37 shown in FIG. 3, the condition state sensed by a sensor S for operation Op5 was within tolerance limits set for operation Op5. It would be understood that as the data display 138 is continuously generated by the facility server L3 in real time to provide the data display 138 to a user interface 74 in real time, the mode in which the actual cycle indicator 31 (the data feature 141) is displayed would change from "green" mode to "red" mode at any time the actual cycle of the operation being performed by operation Op5 was sensed to be out of tolerance, and would revert to "green" mode at any time the actual cycle of the operation being performed by operation Op5 was sensed to be intolerance, such that a user viewing the data display 138, e.g., the SOP timeline display 33 in the present example, could monitor the condition of the operation Op5 in real time.

Each of the FIGS. 3, 4, 6-8 and FIGS. 10-20 is illustrative of a display template 137 and data display 138 which can be generated by a server such as facility server L3 or enterprise server L4 using data generated by and/or within the enterprise 12, including data generated by a machine 16 and/or a system SY, and/or data stored in data memory storage 90, e.g., data collected and/or compiled by AOS 10. The illustrative examples are non-limiting and it would be understood that the display templates 137 shown herein as data populated data displays 138 are representative of only a portion of the display templates 137 which can be generated by the system described herein and/or using data of an AOS 10.

Referring now to FIG. 4, an example display template 137 shown as a data populated data display 138 is shown, where the data display 138 is arranged as a heartbeat display 35. The heartbeat display 35 shows a SOP 39 displayed on the horizontal axis (as shown on the page). A heartbeat 88 of the SOP 39 is shown as a first data feature 141 of the heartbeat display 35, and an actual cycle indicator 31 is shown as a second data feature 141 displayed by the heartbeat display 35, where an actual cycle indicator 31 is shown for each of the operations Op1 . . . Op9 of the SOP 39. The second data feature 141, e.g., the actual cycle indicator 31, is a differentiated data feature 142 differentiated by the color of the vertical bar displaying the actual cycle indicator 31. The differentiated data feature 142 (the actual cycle indicator 31) is displayed in one or the other modes 143 which in the example include a "green" mode when the actual cycle indicator 31 is within a predetermined tolerance for a respective one of the operations Op1 . . . Op9 at the actual time the heartbeat display 35 is generated, and includes a "red" mode when the actual cycle indicator 31 is outside a predetermined tolerance, where the mode 143 displayed for the actual cycle indicator 31 of a respective operation Op1 . . . Op9 is determined by the sensor data generated by the sensor S sensing the actual cycle condition of the respective operation Op1 . . . Op9 at the immediate, e.g., actual time the heartbeat display 35 is generated.

Figure 6:
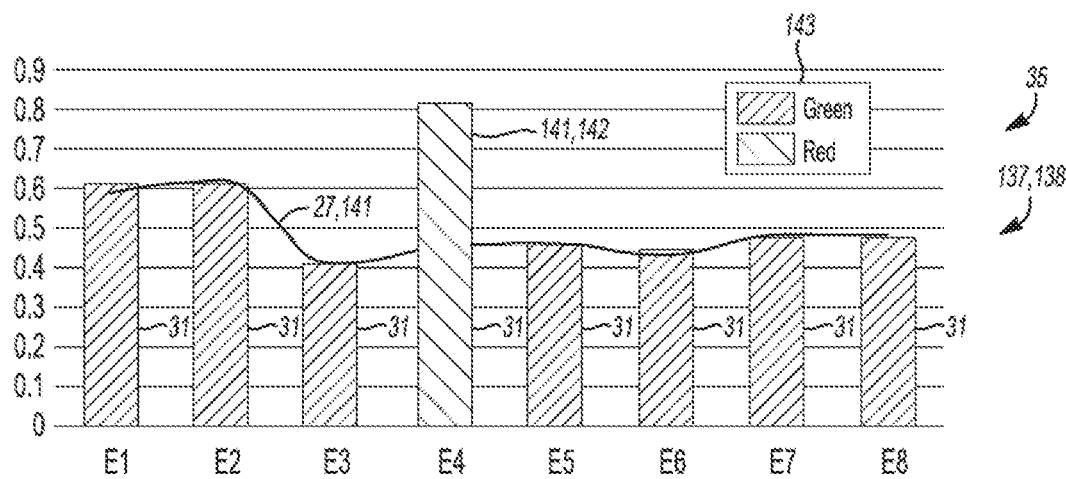
FIG. 6 is a schematic illustration of an example of a machine heartbeat of a group of elements of the machine of FIG. 2.

Referring now to FIG. 6, an example display template 137 shown as a data populated data display 138 is shown, where the data display 138 is arranged as a heartbeat display 35. The heartbeat display 35 shows a SOP 39 displayed on the horizontal axis (as shown on the page). A heartbeat 88 of the SOP 39 is shown as a first data feature 141 of the heartbeat display 35, and an actual cycle indicator 31 is shown as a second data feature 141 displayed by the heartbeat display 35, where an actual cycle indicator 31 is shown for each of the operations Op1 . . . Op9 of the SOP 39. The second data feature 141, e.g., the actual cycle indicator 31, is a differentiated data feature 142 differentiated by the color of the vertical bar displaying the actual cycle indicator 31 (shown in the figure as shading indicating colors by name for clarity of illustration). The differentiated data feature 142 (the actual cycle indicator 31) is displayed in one or the other modes 143 which in the example include a "green" mode (displayed in a green color but shown in the figure by shading for clarity of illustration) when the actual cycle indicator 31 is within a predetermined tolerance for a respective one of the operations Op1 . . . Op9 at the actual time the heartbeat display 35 is generated, and includes a "red" mode (displayed in a red color but shown in the figure by shading for clarity of illustration) when the actual cycle indicator 31 is outside a predetermined tolerance, where the mode 143 displayed for the actual cycle indicator 31 of a respective operation Op1 . . . Op9 is determined by the sensor data generated by the sensor S sensing the actual cycle condition of the respective operation Op1 . . . Op9 at the immediate, e.g., actual time the heartbeat display 35 is generated.

Figure 7:
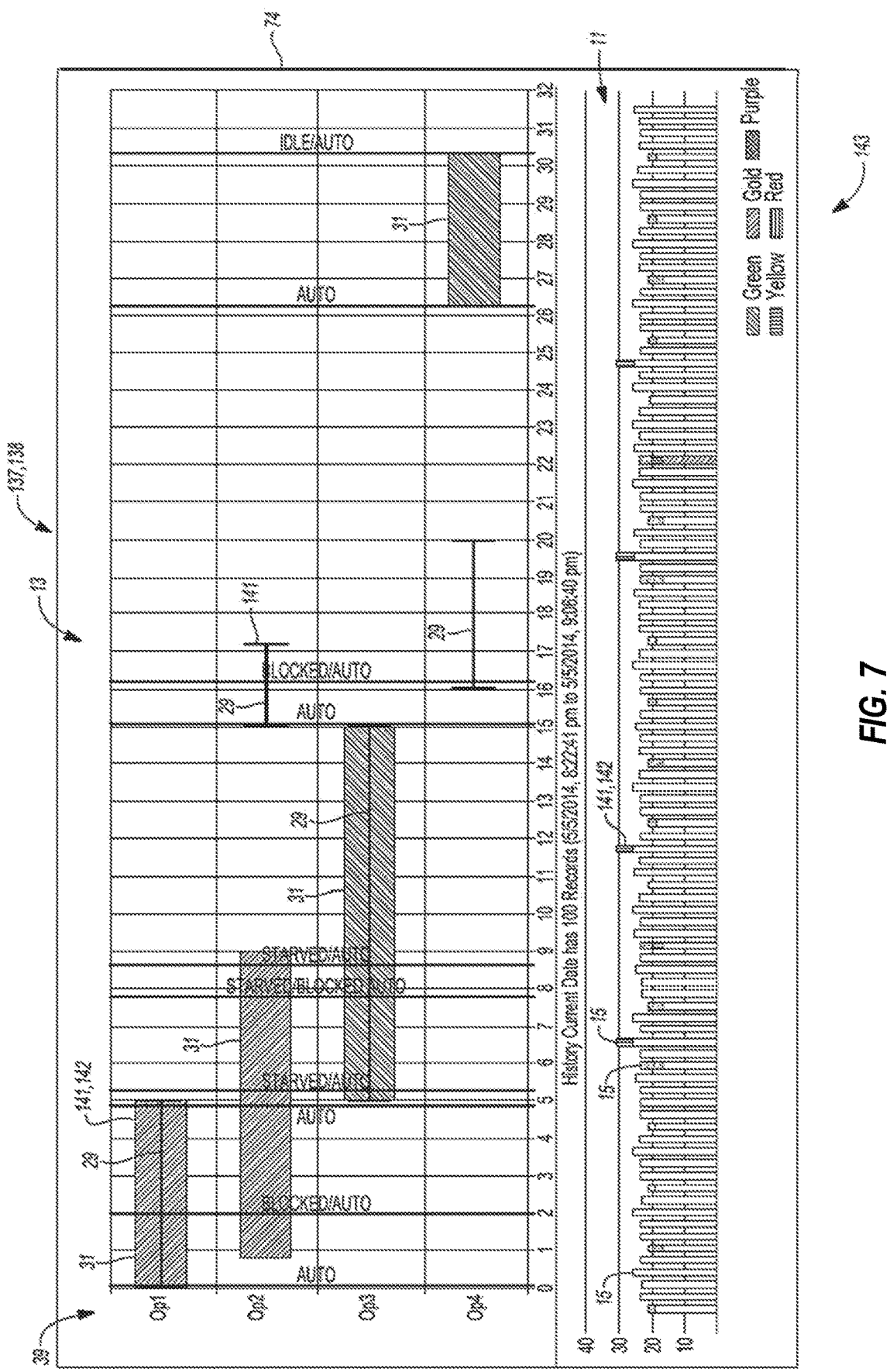
FIG. 7 is a schematic illustration of an example of a machine sequence of operations of a machine of the system of FIG. 1 illustrating multiple changes in the condition state of the machine during the operational cycle.
Figure 8:
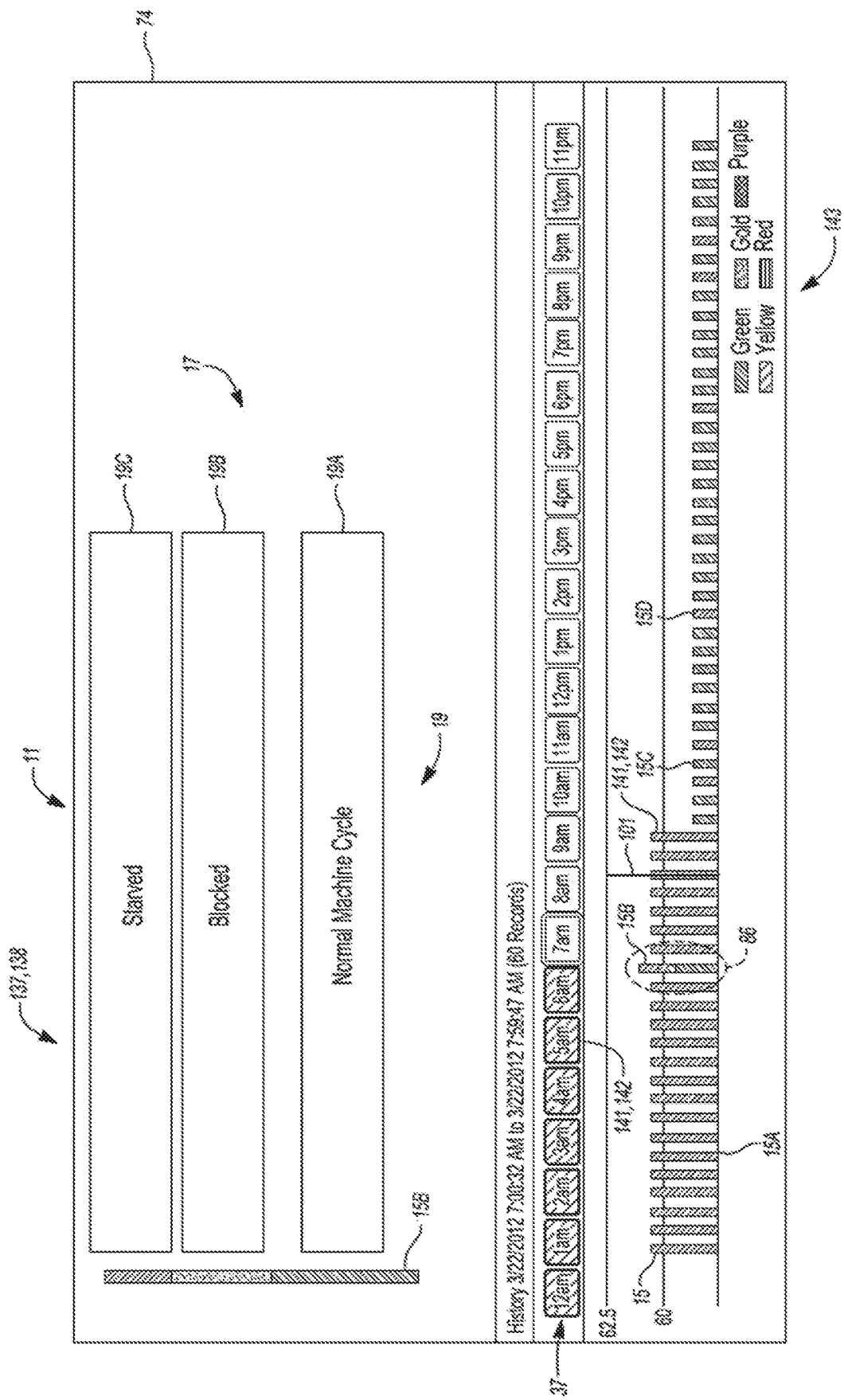
FIG. 8 is a schematic illustration of an example of a historical view of the condition states of a machine of the system of FIG. 1.
Figure 9:
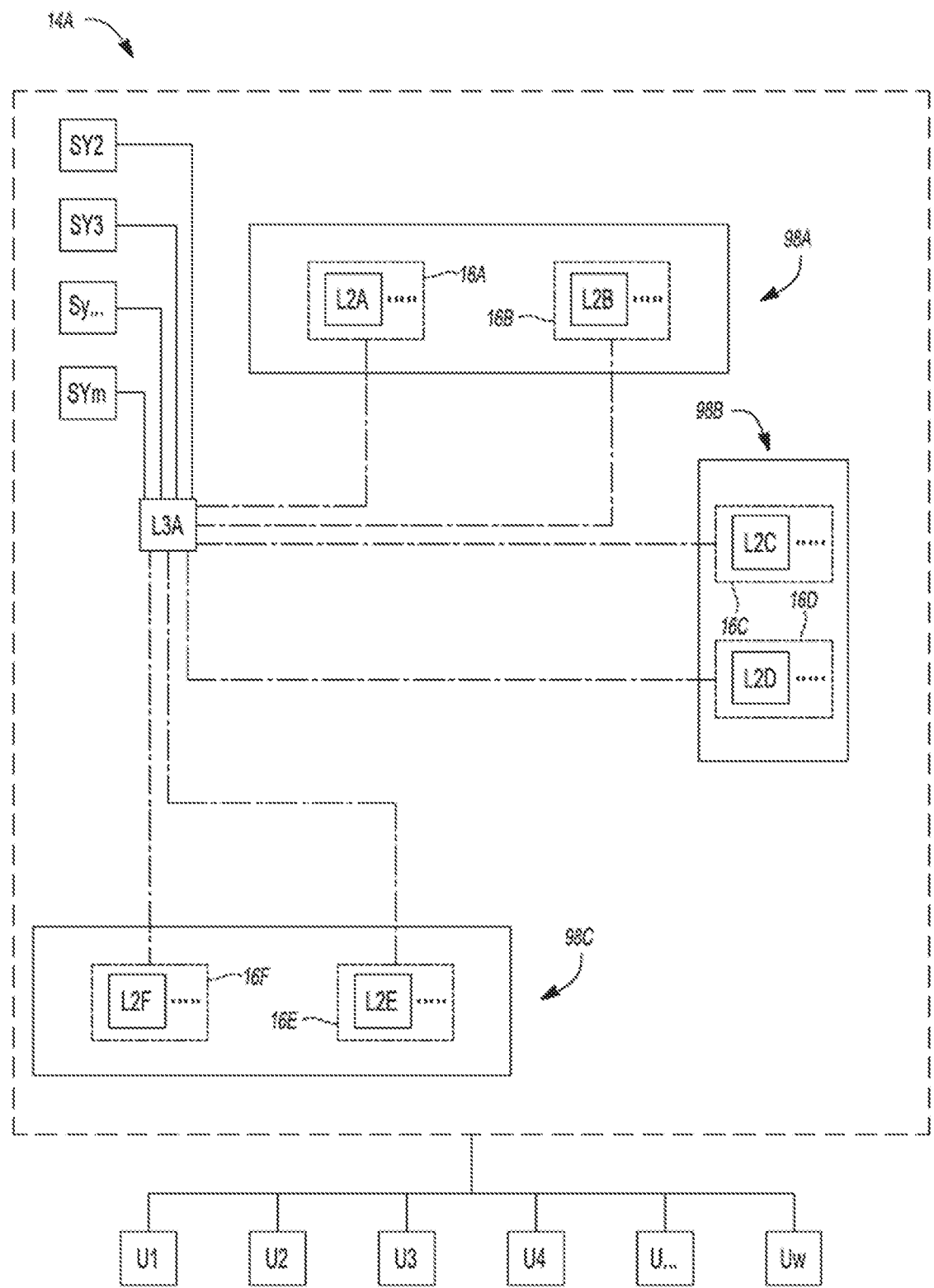
FIG. 9 is a schematic view of a facility management system of the system of FIG. 1, showing a plurality of machines grouped in zones.

Referring now to FIG. 7, an example display template 137 shown as a data populated data display 138 is shown, where the data display 138 is arranged as a cycle state display including a SOP cycle state display 13 and a heartbeat cycle state display 11. The SOP cycle state display 13 shows a SOP 39 displayed on the vertical axis (as shown on the page), including operations Op1 . . . Op4. A baseline cycle indicator 29 is shown as a first data feature 141 of the SOP cycle state display 13, and an actual cycle indicator 31 is shown as a second data feature 141 displayed by the SOP cycle state display 13, where an actual cycle indicator 31 is shown for each of the operations Op1 . . . Op4 of the SOP 39. The second data feature 141, e.g., the actual cycle indicator 31, is a differentiated data feature 142 differentiated by the color of the vertical bar displaying the actual cycle indicator 31. The differentiated data feature 142 (the actual cycle indicator 31) is displayed in one of a plurality of modes 143 which in the example include "green", "gold", "purple", "yellow" and "red" modes, each representing a different operating condition of the actual cycle of the respective operation Op1 . . . Op4. The mode displayed by the actual cycle indicator 31 for each operation Op1 . . . Op4 indicates the condition state of that operation sensed by a sensor S at the immediate time the data display 138 shown in FIG. 7 was generated. For example, the actual cycle indicators 31 for operations Op1 and Op2 are displayed in the "gold" mode, indicating, for example, that these two operations are in a "starved" cycle state corresponding to the "gold" mode. By way of non-limiting example, the "green" mode can indicate an operation is in "auto" cycle state, the "red" mode can indicate the operation is in a "faulted" cycle state, the "purple" mode can indicate the operation is in a "blocked" cycle state, and the "yellow" mode can indicate the operation is in a "stopped" cycle state. In the example shown, the cycle state at the immediate time the data display 141 shown in FIG. 7 was generated, can be noted on the SOP cycle state display 13 in text, e.g., as "AUTO", "BLOCKED/AUTO" etc. The heartbeat cycle state display 11 included in the data display 138 and shown at the bottom portion of the user interface 74 (as shown on the page) includes a heartbeat display 11 of the cycle times of each of a series of performances of the SOP 39 displayed in chronological order by cycle bars 15, with the last (far right as shown on the page) cycle bar 15 corresponding to the actual, e.g., immediate time the data display 137 shown in FIG. 7 was generated, e.g., as shown on the figure, at 9:06:40 pm on May 5, 2014. The cycle bar 15 is shown as a data feature 141, and is a differentiated data feature 142, where the cycle bar 15 is a stacked bar, using the same modes 143 defined for the SOP cycle state display 13, the amount of time in each performance of the SOP 39, e.g., in each fully operational cycle of the SOP 39, the time spent in each of the modes 143. For example, referring to FIG. 8, where the heartbeat cycle state display 11 shown in FIG. 8 has been generated at a different actual time than the heartbeat cycle state display 11 shown in FIG. 7, a cycle bar 15A is displayed in the "yellow" mode as a stopped cycle state. A cycle bar 15B is displayed as a stacked bar with each bar segment of the stacked bar shown in a different mode 143 indicating for approximately half of the operational cycle time represented by the cycle bar 15B the machine 16 was in a "green" (auto cycle state) mode, approximately one quarter of the operational cycle time represented by the cycle bar 15B the machine 16 was in a "gold" (starved cycle state) mode, and approximately one quarter of the operational cycle time represented by the cycle bar 15B the machine 16 was in a "yellow" (stopped cycle state) mode. A subsequent (in time) cycle bar 15C is displayed in "green" (auto) mode and yet another subsequent (in time) cycle bar 15D is displayed in "yellow" (stopped cycle state) mode, where each of these colors is shown in the figure as shading corresponding to the color name shown in the legend of modes 143 or clarity of illustration.

Referring again to FIG. 8, the heartbeat cycle state display 11 included in the data display 138 of FIG. 7 is shown at the bottom portion of the user interface 74 (as shown on the page). In the example shown, the data template 137 defines a user interface element (UIE) 86 associated with each of the vertical cycle bars 15. For clarity of illustration, only one of the UIE 86 associated with one of the cycle bars 15 is shown. A user applying a touch input to the UIE 86, for example, applying finger point pressure to the cycle bar associated with the UIE 86 activates the display template 137 to display the additional information shown in the upper portion of the user interface 74 (as shown on the page), where the additional information included a magnified (zoomed in) view 17 of the cycle bar 15B, and further textual descriptions and/or labels 19A, 19B, and 19C identifying each of the bar segments of the cycle bar 15B by cycle state, e.g., as "normal", "blocked" and "starved." Not shown but understood, each of the labels 19A, 19B, 19C may be associated by the display template 137 with a UIE 86, such that a touch input to one of the labels 19 can activate the display template 137 to display additional details of the condition states associated with each bar segment on the data display 138. In the example shown, a digital marker 101 is displayed to mark a specific one of the cycle bars 15. In the example shown, the digital marker 101 is used to identify the operational cycle of the machine where a corrective action was taken in response to the blocked condition occurring in the operational cycle represented by the cycle bar 15B. The modes 143 displayed for the cycle bars 15 subsequent (in time) to the cycle bar 15 marked by the marker 101, can be monitored to determine, for example, the effectiveness of the corrective action taken earlier.

Figure 10:
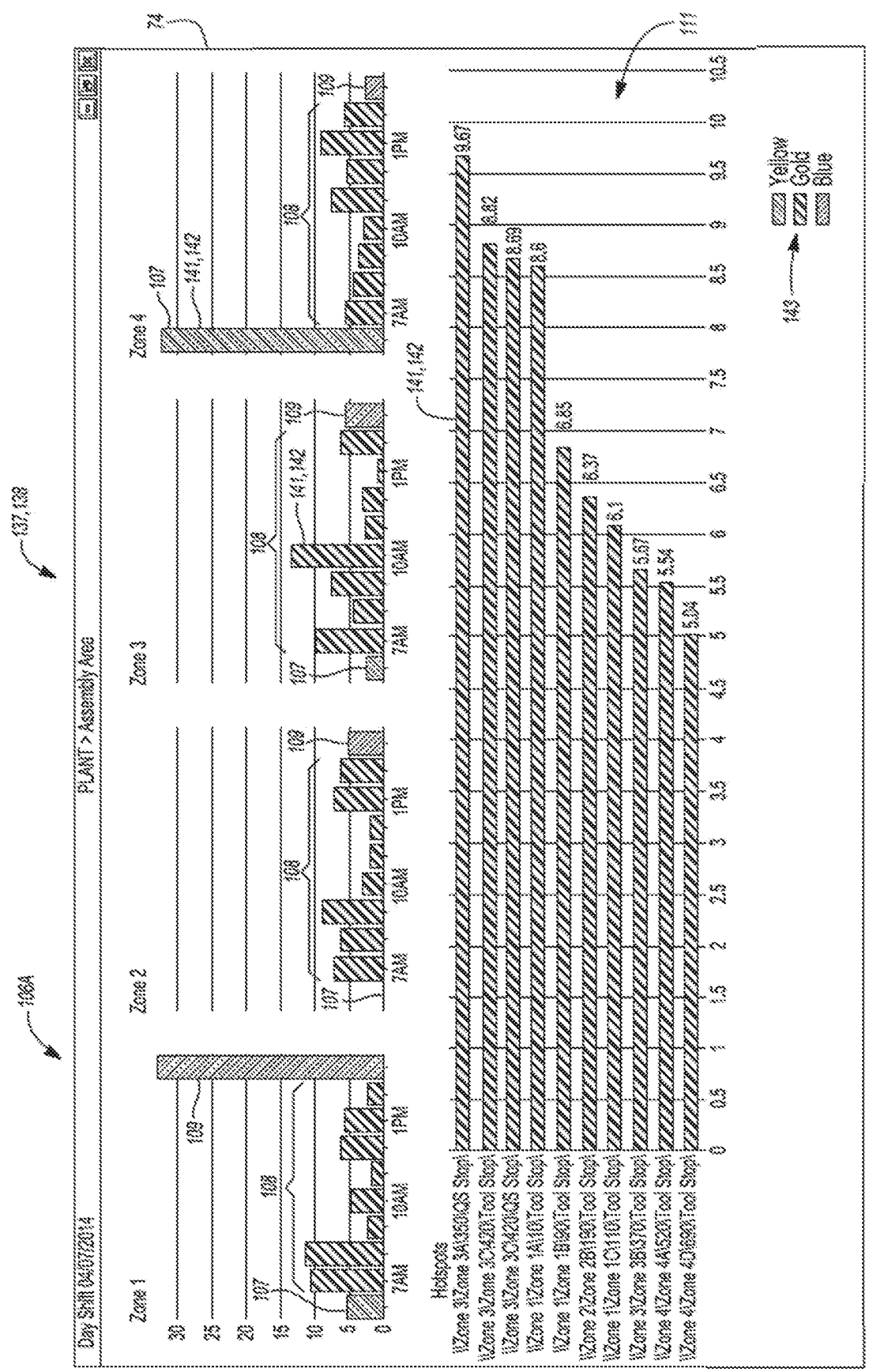
FIG. 10 is a schematic illustration of an example of stoppage time incurred during a production shift by hour, shown for a plurality of zones of the system shown in FIG. 9.
Figure 11:
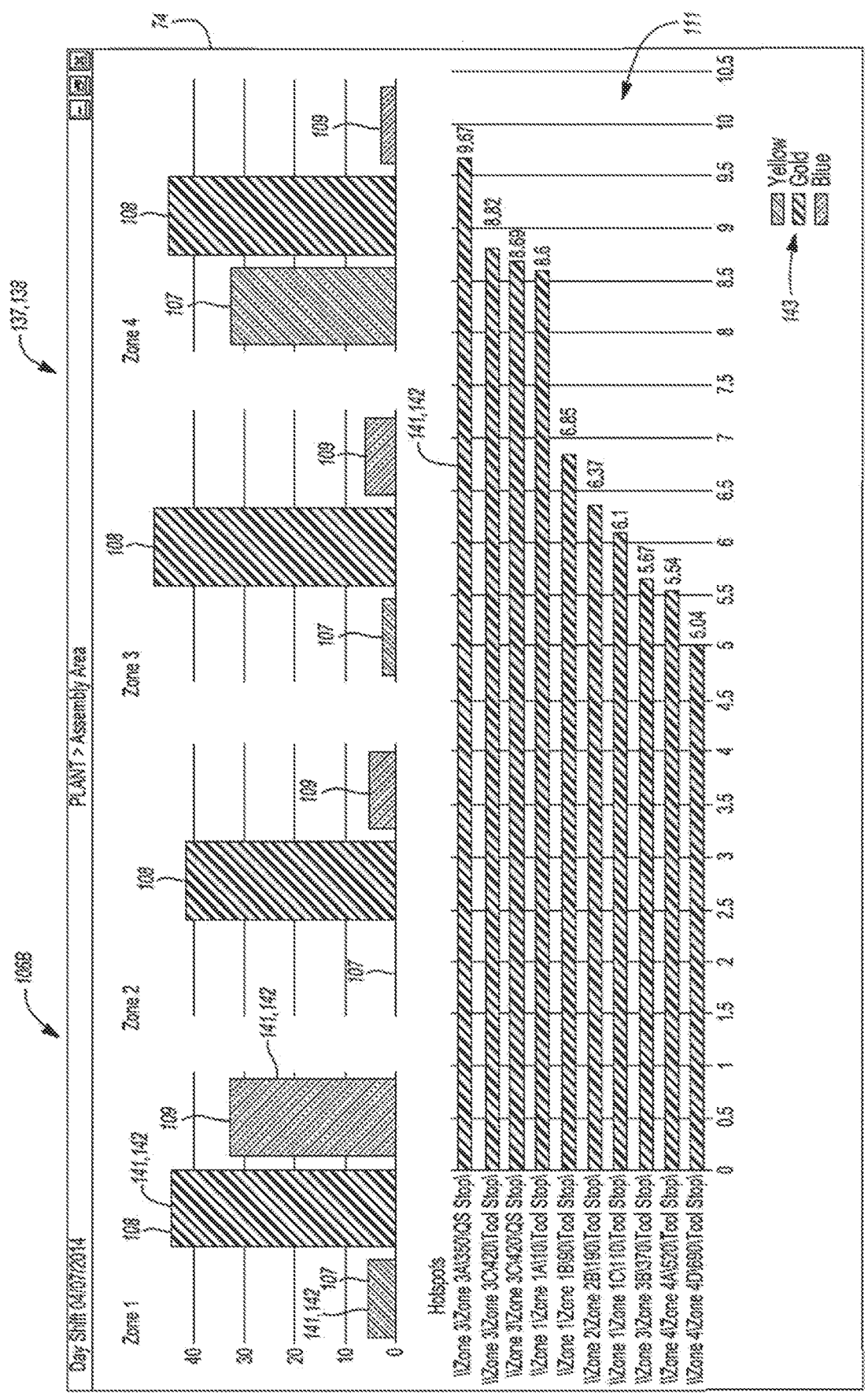
FIG. 11 is a schematic illustration of an example of a summary of stoppage time incurred during a production shift, shown for a plurality of zones of the system shown in FIG. 9.
Figure 12:
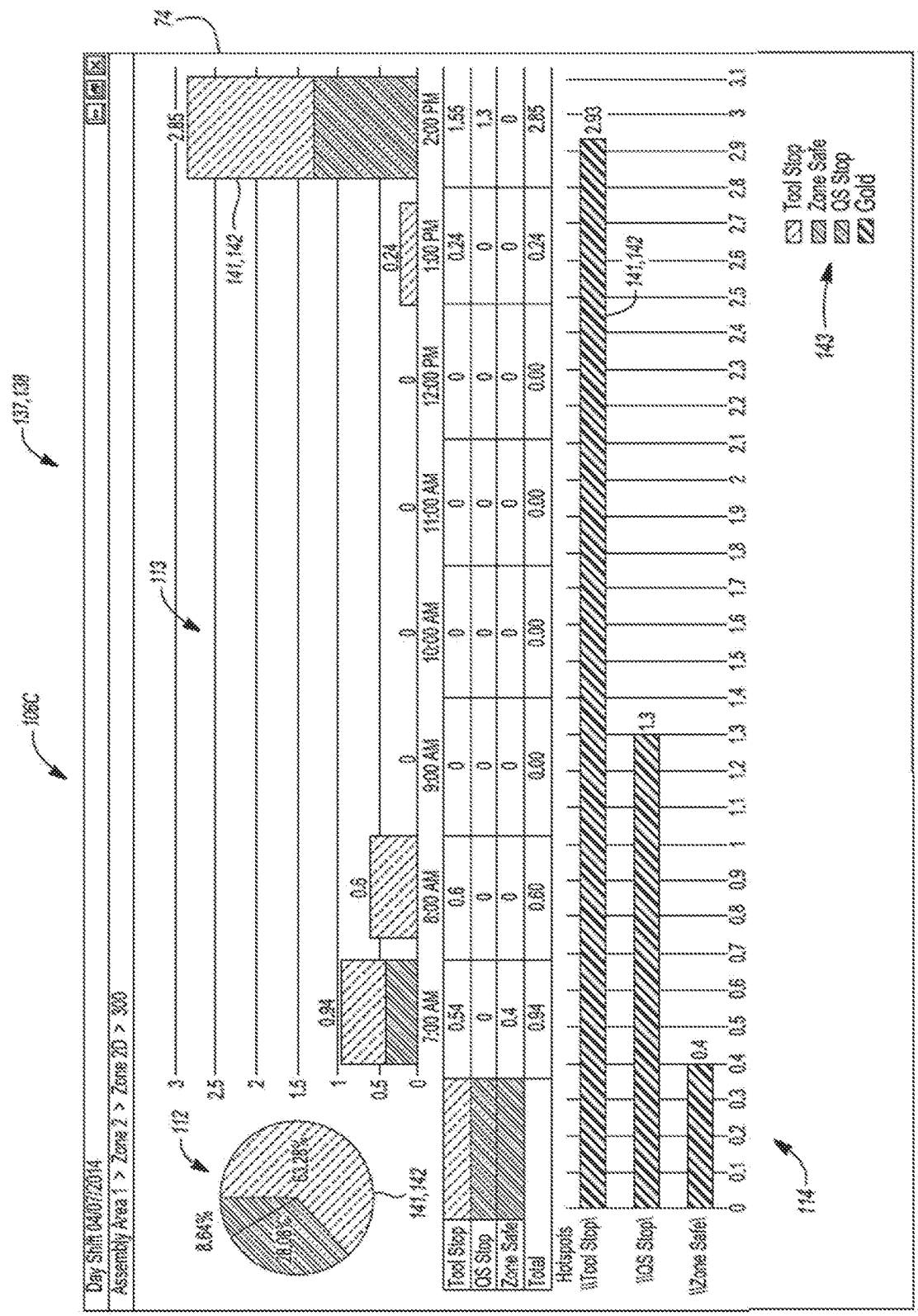
FIG. 12 is a schematic illustration of an example of stoppage time incurred during a production shift, shown for a station within a machine.

Referring now to FIGS. 10-12, an example display template 137 shown as a data populated data display 138 is shown in each of FIGS. 10-12, where the data display 138 in each example is arranged as a production system display for showing stoppages in each of four zones 98 (Zone 1 through Zone 4) in a plant assembly area, using a different display template 137 for generating each of the three different production system displays 106A, 106B 106C. The production system display 106 can also be referred to as a stoppage time display. In an illustrative example, the production system displays 106A, 106B, 106C each display stoppage data sensed for automatic guided vehicles (AGVs) (not shown) used to move products from one station ST to the next station ST in an assembly area within each zone 98, where it is desirable that each AGV moves continuously without stoppage through every station ST in the zone. A zone can be, for example, a zone such as zones 98A, 98B, 98C shown in FIG. 9, where each zone 98A, 98b, 98C is configured similarly such that comparison of the stoppage time in one zone 98 to another zone 98 facilities identification and prioritization of top causal factors for corrective action and/or best practices for replication across the zones. Referring to FIG. 10, the production system display 106A displays data collected in a current production shift for each of zone 1 through zone 4, where the data is displayed in real time at the actual time during the production shift when the data display 106A is generated. For each zone 98, a vertical bar 107 representing cumulative starved time during a shift is shown as a first data feature 141 in the present example. Starved time includes stoppage time of AGVs in the zone 98 which is caused by a starved state, for example, due to a parts shortage. For each zone, vertical bars 108 representing other stoppage time of AGVs in the zone is shown as a second data feature 141 which is displayed for each hour in the shift. Other stoppage time includes stoppage time caused by causes other than blocked or starved, such as a quality system (QS) stop, a tool stop, a zone safe stop, and/or a miscellaneous stop. In one example, each stoppage can be grouped as micro (less than 30 seconds) minor (between 30 seconds to 2 minutes) and/or major (over 2 minutes) stops. For each zone 98, a vertical bar 109 representing cumulative blocked time during the shift is shown as a third data feature 141. Blocked time includes stoppage time of AGVs in the zone which is caused by a blocked state, for example, due to stoppage of an AGV in a downstream station. Each of the first, second and third data features 141 in the present example is also a differentiated feature 142, differentiated in the present example by color (shown in the figure as shading indicating colors by name for clarity of illustration), where in the present example the "yellow" mode 143 indicates starved time, the "gold" mode 143 indicates other stoppage time, and the "blue" mode 143 indicates blocked time. In the lower portion (as shown on the page) of FIG. 11, a top causal factor display 111 is shown, also referred to as a hotspots display 111 showing the top causal factors of stoppage time. In the example shown, the top causal factor of stoppage time is QS (quality system) stop time occurring in station 350 of sub-zone 3A of zone 3, and the data feature 141, the horizontal bar (as shown in the figure) showing total stoppage time for this causal factor of 9.67 seconds, is a differentiated factor 142 displayed in the "gold" mode 143 indicating the top causal factor is other stoppage time, specifically QS stop time, in station 350. The method and system for generating data displays 138 from data templates 137 in real time with real time data is advantaged, as shown by the example of FIG. 10, by providing in immediate time, e.g., in real time, an efficient and visually effective and succinct consolidation of data regarding, in the present example, the condition state of multiple zones within a production facilities, such that a user/view of the data display 138 can rapidly assess the condition states, determine priorities for corrective actions and/or countermeasures to identified productivity or efficiency losses, and/or identify best practices for replication across the zones.

Referring to FIG. 11, the production system display 106B displays the data using first, second and third differentiated data features 141, 142, where in the example shown in FIG. 11, the stoppage time due to other causes, e.g., data feature 108, is shown as an accumulated duration for the shift being displayed, accumulated over the shift time until the actual time the data display 138, e.g., the stoppage time display 106B is generated in real time. Referring to FIG. 12, the production system display 106C includes a first data display 113 of stoppage time (as a first data feature 141) displayed for a station ST, such as station ST300 of sub-zone 2D in the present example, displayed by hour using a vertical stacked bar (as shown on the page) which is a differentiated data feature 142 displaying each of the bar segments of each stacked bar in a mode 143 corresponding to the type of stoppage time displayed by the bar segment. In the example shown in FIG. 12, the modes 143 shown in stoppage time by station display 113 include "tool stop", "zone safe" and "QS stop", each mode 143 differentiated by shading for clarity of illustration in the figures. It would be understood that each of the modes 143 could be differentiated by shading, by color, or by another visual indication such as outline style, and that the illustrative example shown is non-limiting. A stoppage time display by type 112 shows the distribution of stoppage time accumulated in the current production shift in a pie chart arranged by type of stoppage time, where the data feature 141 shown as a percentage of total time is differentiated such that each pie portion of the pie chart 112 is displayed in a different mode 143. In the bottom portion (as shown on the page) of the data display 138 shown in FIG. 12, a top causal factor by mode display 114 is shown, showing in a display of horizontal bars (as shown on the page) the cumulative stoppage time for each of the causes of stoppage. Non-differentiated data features 141 are displayed in the data display 138 shown in FIG. 12, such as the matrix of stoppage times by cause and hour of shift production.

Figure 13:
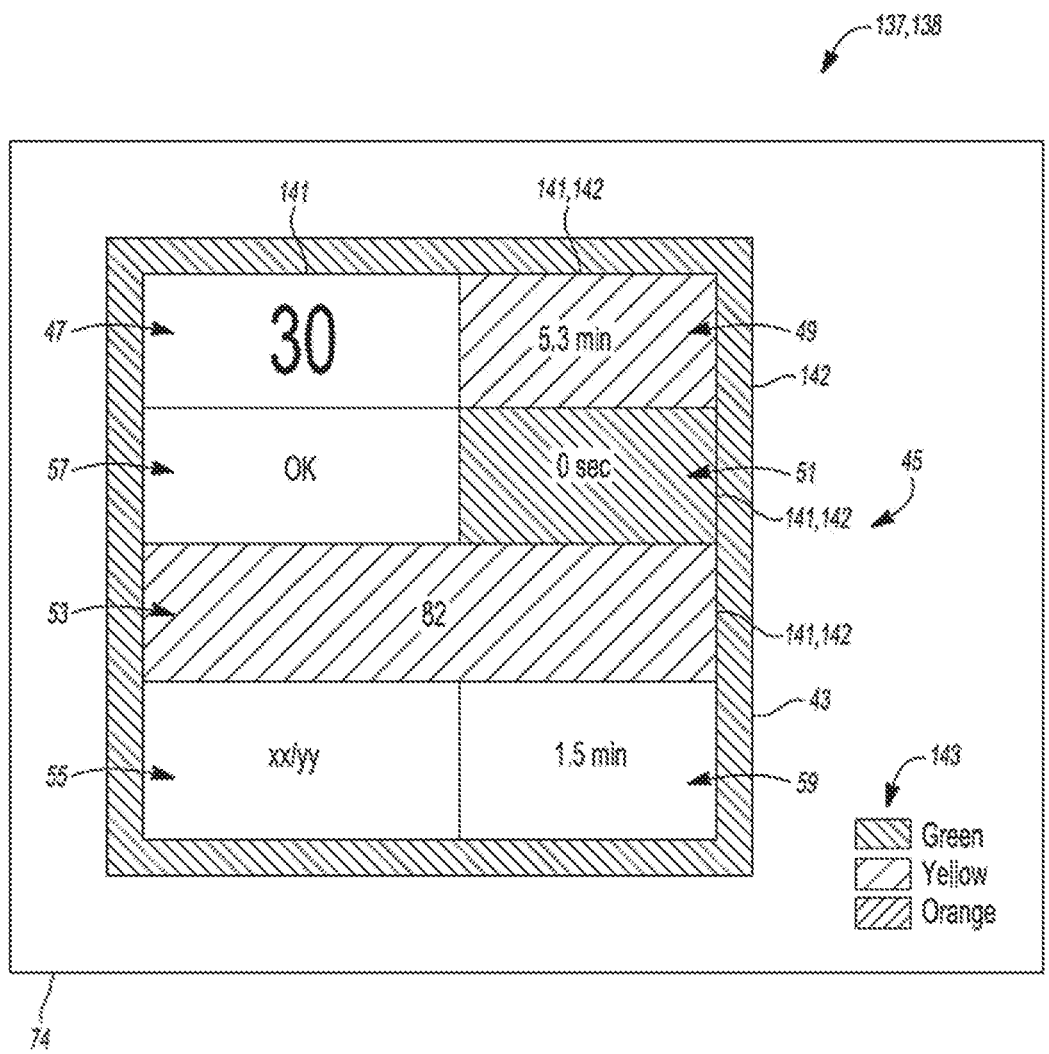
FIG. 13 is a schematic illustration of an example of a digitized asset of the system shown in FIG. 1.
Figure 14:
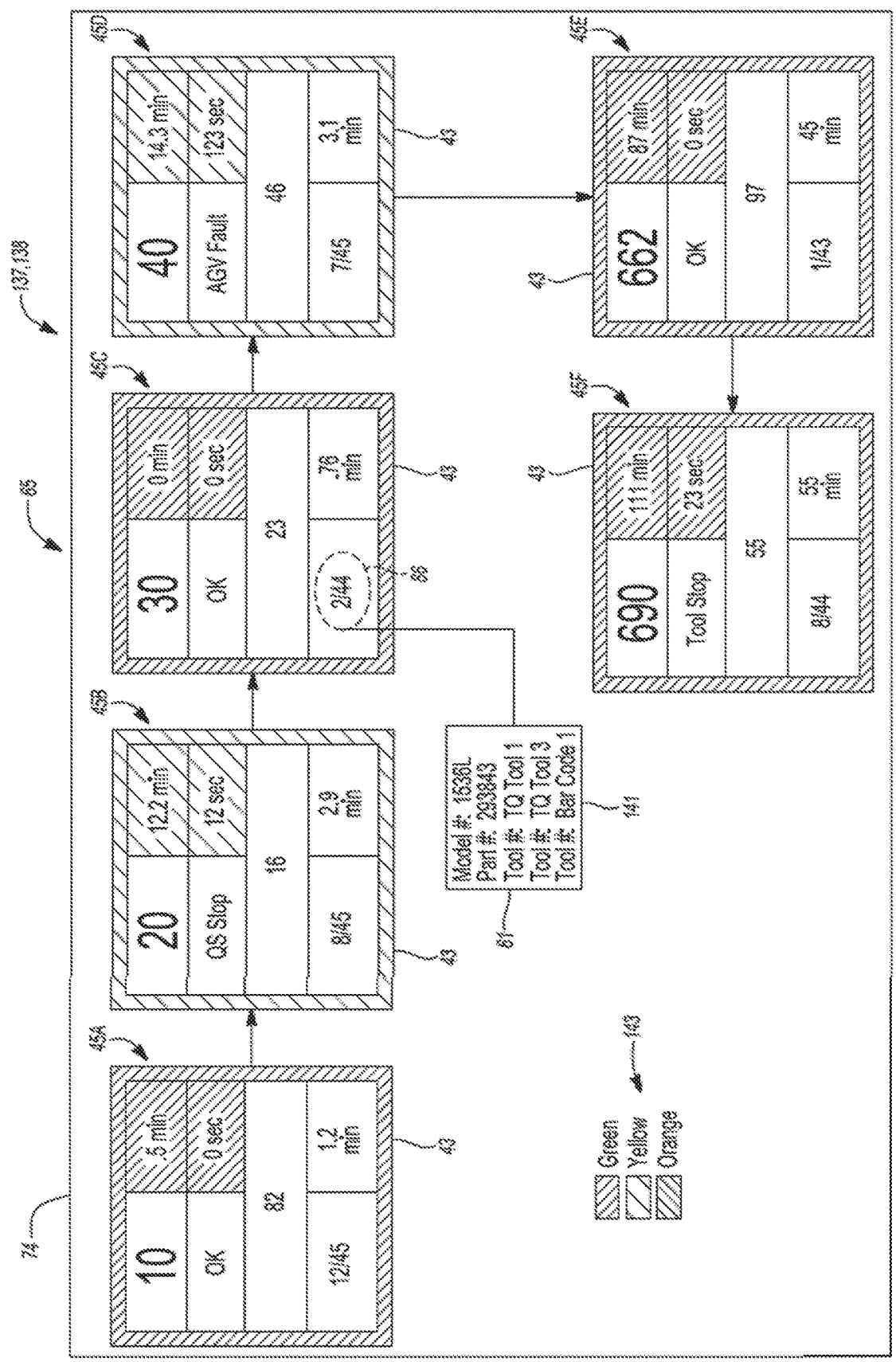
FIG. 14 is a schematic illustration of an example of multiple digitized assets of the system shown in FIG. 1, displayed in a user device interface.
Figure 15:
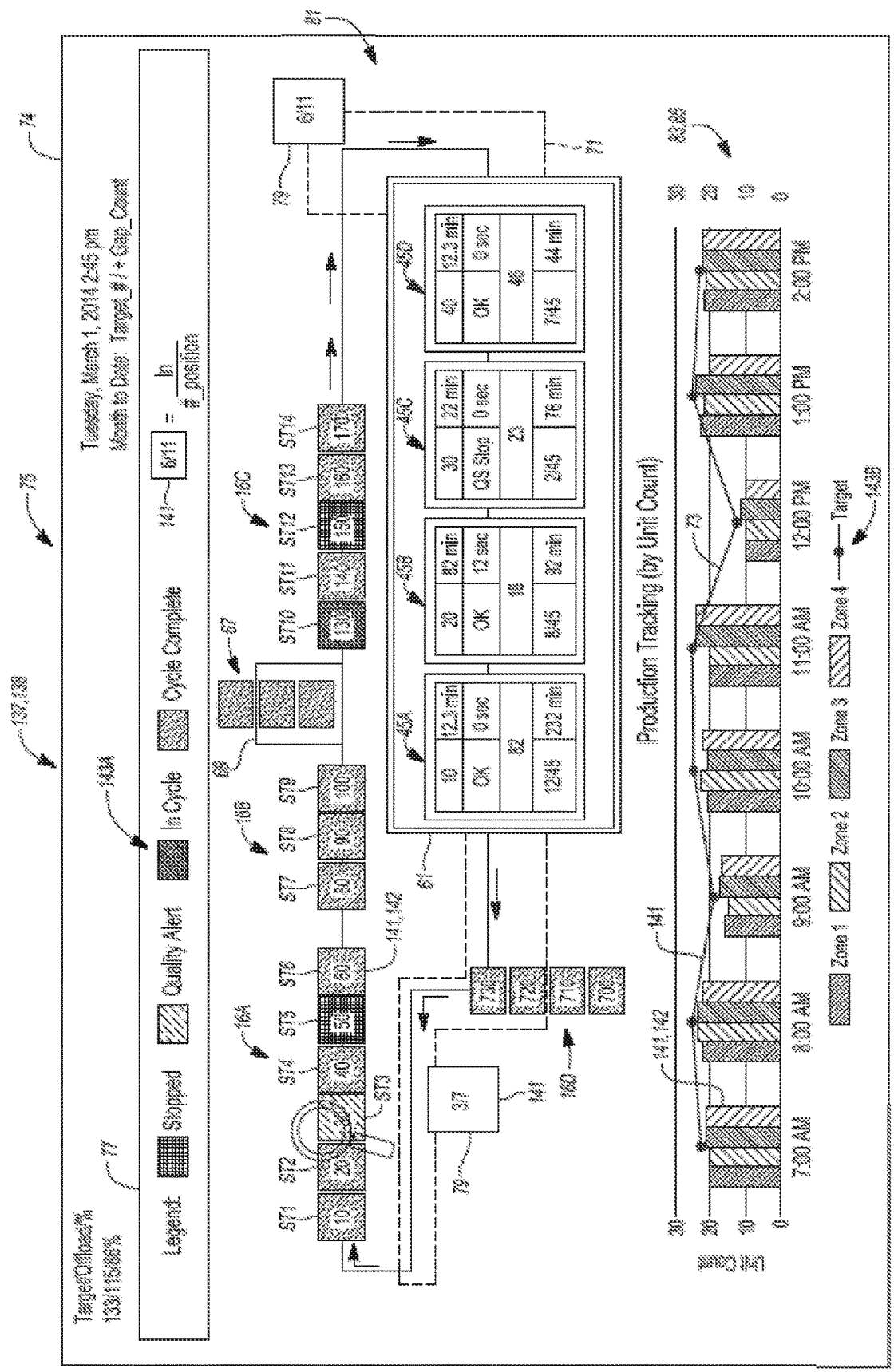
FIG. 15 is a schematic illustration of an example of a production dashboard of a digitized zone.

Referring now to FIGS. 13-16, an example display template 137 shown as a data populated data display 138 is shown in each of FIGS. 13-16, where the data display 138 in each example is arranged as a digitized asset display 106 for showing one or more data features 141 which are digitized representations of an asset in a system such as enterprise 12. An asset, as that term is used herein, can be any asset of the enterprise 12, such as an element E, sensor S, power source P, server L3, L4, controller L1, L2, machine 15, an asset of a facility 14, etc. Non-limiting illustrative examples of an asset can be a robot, a tool, a tool tray, a torque wrench, a computer numerically controlled (CNC) machine, an AGV, an elevator in a building, etc. or any other tool, machine M, element E, or object that performs a set of tasks. In one example, the set of tasks performed by an asset can be included in an SOP 39. Referring to FIG. 13, a display template 137 shown as a data populated data display 138 is shown as a digitized asset display 45, where a singular asset is displayed using a plurality of data features 141 including an asset identification number 47, a current active group name 57, and a pallet and/or AGV number 53 to which the asset identified by the identification number 47 is associated and, for example, is being transport by from one station ST to another station ST in a production line, as shown in FIG. 15 in an area dashboard display 75 of a production line. In the example shown in FIG. 13, the digitized asset display 45 includes additional data features 141 which are related to a condition state and/or operation or task status of the asset having the asset identification number 47, shown in the present example as asset number "30". For example, a current cycle running time 49, a current group running time 51, an accumulated time for over cycle time for a current shift 59, and a ratio 55 of accumulated number of over cycle cycles (xx) to the total cycle count (yy) for a current shift are show as data features 141 of the digitized asset display 45 shown in FIG. 13. As shown in the example, a number of the data features 141 are differentiated features 142 displayed in one of the modes 143, e.g., differentiated by display in one of a "green" mode, a "yellow" mode, and an "orange" mode. The differentiated features 142 include features 49, 51 and 53 in the present example. A digitized asset status feature 43 is shown as a differentiated border surrounding the other data features, and displays an overall status and/or condition state 43 of the digitized asset, which in the present example is identified as asset number 30, by displaying the condition state 43 (the border) in one of the modes 143 shown in FIG. 13. As shown in the example, the condition state 43 of the digitized asset number 30 shown in the digitized asset display 45 is displayed in "green" mode. FIG. 14 shows a data display 138 arranged as a multiple asset display 65, including multiple digitized asset displays 45A . . . 45F. In the example shown in FIG. 14, a UIE 86 is defined by the display template 137 for data feature 55 of the digitized asset display 45, such that a touch input by a user viewing the data display 65 on a user interface 74 of a user device U would activate the display template 137 to generate and display a pop-up window 61 providing additional information, which in the present example includes model, part and tool number information for the digitized asset having identification number 30 and represented by the digitized asset display 45C.

Figure 16:
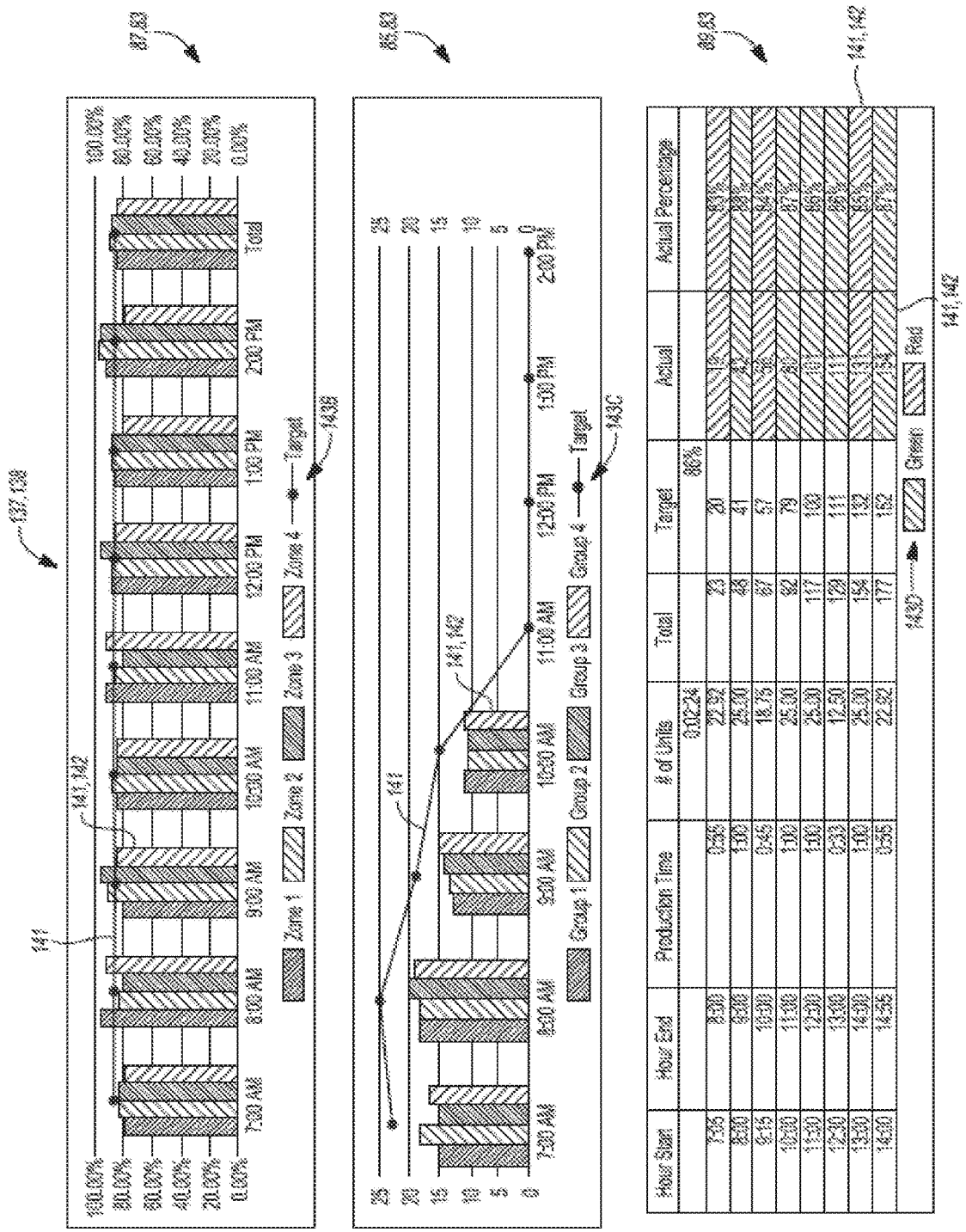
FIG. 16 is a schematic illustration of example of production tracking reports which may be displayed in the dashboard of FIG. 15.

FIG. 15 shows a display template 137 and data display 138 arranged as an area dashboard display 75 including an area display 81 including multiple differentiated data features 142 which are displayed in one of the modes 143A associated with the area display 81 and displayed in a legend 77, and further includes a production by zone display 87, which is one a plurality of production tracking displays 83 (see FIG. 16) which can be displayed in the bottom portion (as shown on the page) of the area dashboard display 75. In one example, a user can provide a touch input to the user interface 74, such as a swipe action, to alternate, e.g., switch the production tracking display 83 shown in the bottom portion of the dashboard display 75 between the various production tracking displays 85, 87, 89 shown in FIG. 16. As shown in FIGS. 15 and 16, the production by zone display 87 includes multiple differentiated data features 142 which are displayed in one of the modes 143B, the production by group display 85 includes multiple differentiated data features 142 which are displayed in one of the modes 143C, and the production by count display 89 includes multiple differentiated data features 142 which are displayed in one of the modes 143D shown in FIG. 16. Referring again to FIG. 15, the area display 81 shows a graphical representation of a production line including machines 16A, 16B, 16C, each including a subset of stations ST1 . . . ST14. Station ST1 is digitized as a digitized asset 45 shown in FIG. 15 as identified by its digitized asset identification number 47, e.g., as "Asset 10" in the present example. The digitized asset 45 located in station ST is an "Asset 20", the digitized asset 45 located in station ST10 is "Asset 130" and so on, as shown in the illustrative example of FIG. 15. In the example shown, a user can activate the display template 137 by a touch input to one or more of the digitized assets 45 to activate display of a pop-up window 61. In the present example, a touch input to the area display 81 at a location corresponding to the magnifying glass shown in FIG. 15 displays digitized assets 45A . . . 45D in zoomed in (expanded) detail in the pop-up window 61. The example shown in FIG. 15 is advantaged by the depth and breadth of detailed information regarding the condition state of the production area shown in the area dashboard 75, including the condition states of the assets within the production area. For example, in one display as shown in FIG. 15, a user can view the condition state of each of the digitized assets 45 in each of the stations ST in the production line, where each digitized asset 45 is differentiated to display a condition state mode 143A in macro view, and to display multiple condition states in the zoomed in view in the pop-up window 61, for issue identification and resolution. Additional production line condition state information is displayed by the area display 81, using data features 141 such as buffer inventory feature 79 showing an actual unit count of production units over a target buffer unit count in a designated location defined by a buffer zone 71, and incoming material feature 67 showing the condition state of incoming material in an incoming material staging area 69.

Figure 17:
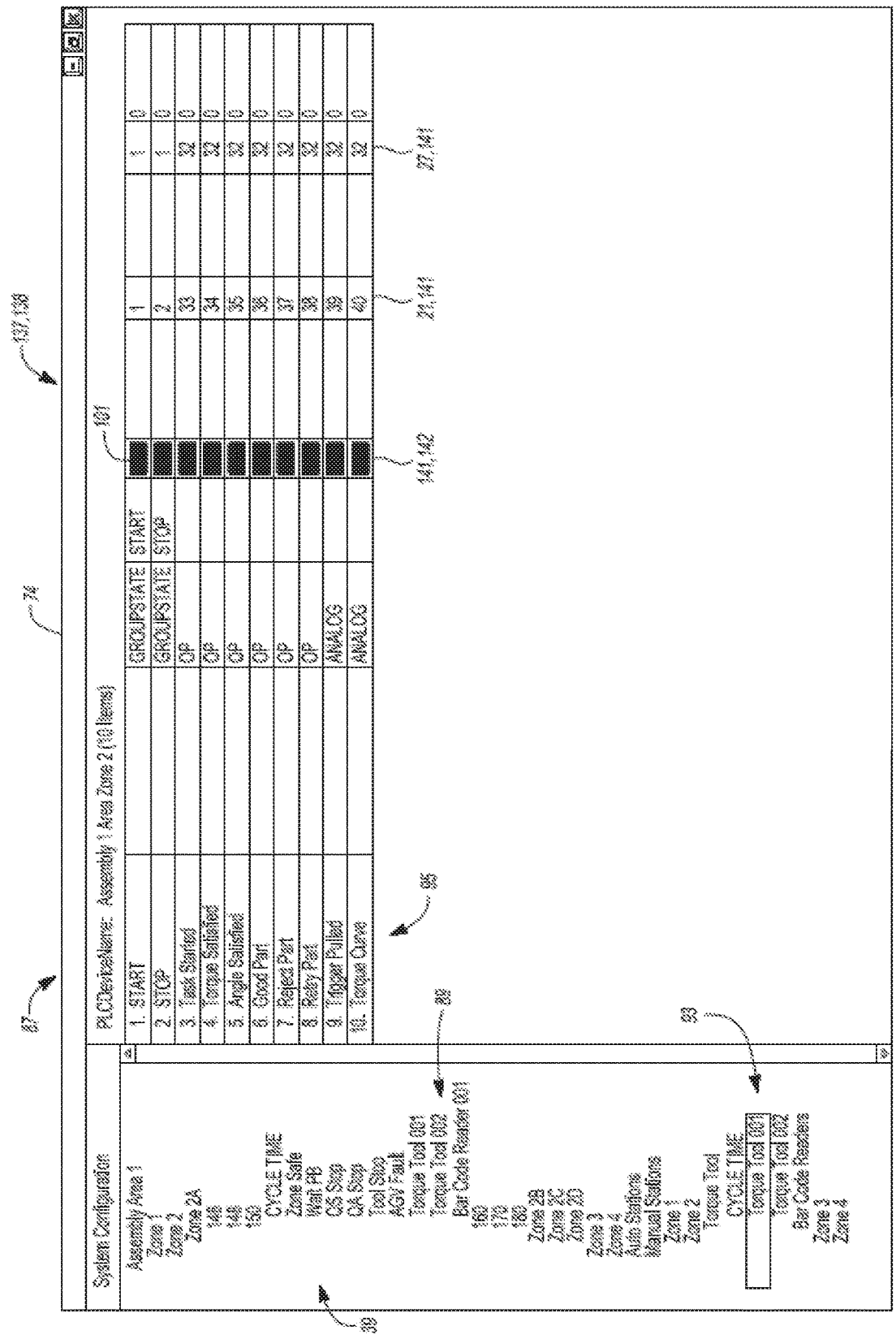
FIG. 17 is a schematic illustration of an example showing digitization of a task group including manual tools.
Figure 18:
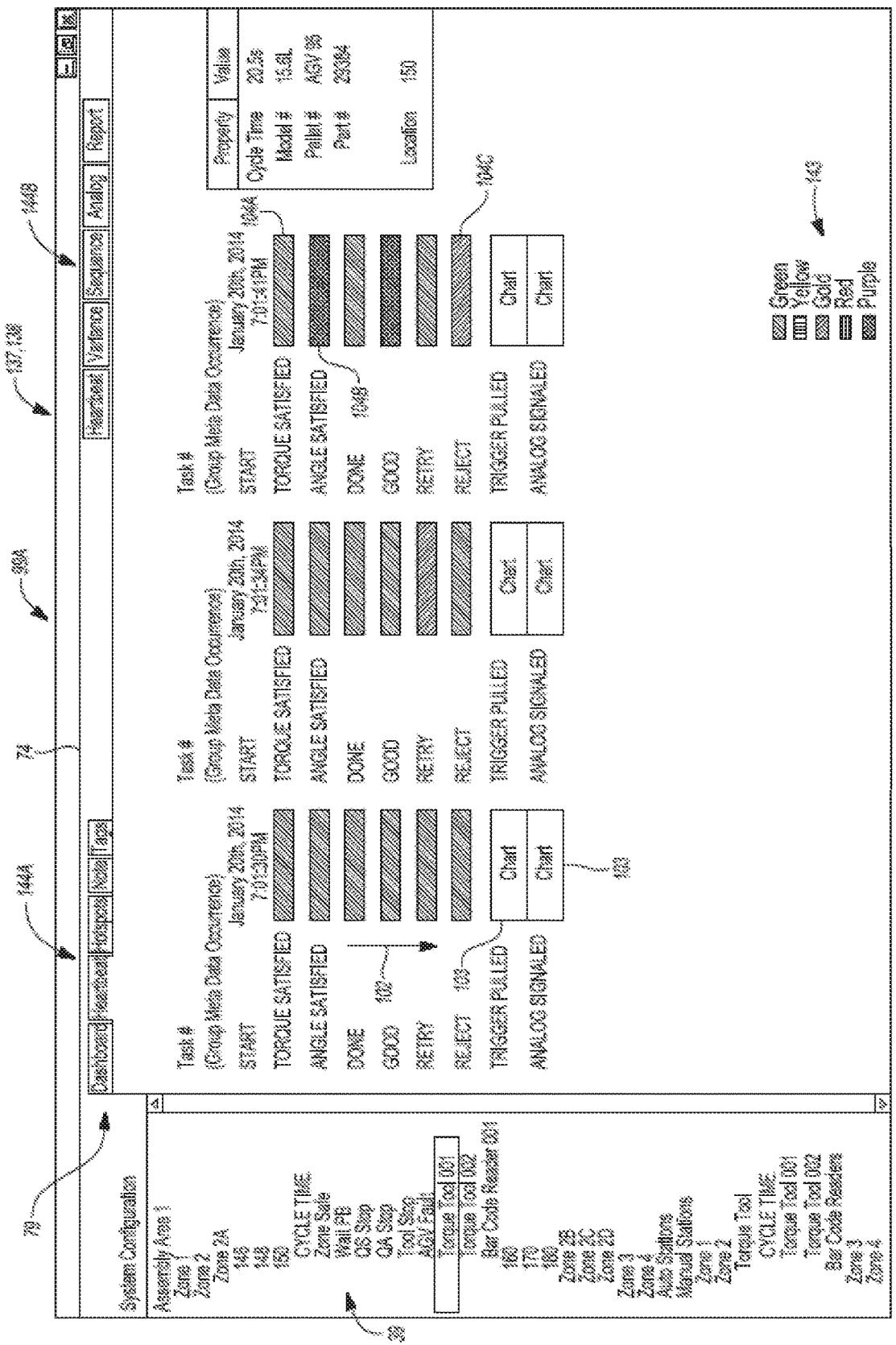
FIG. 18 is a schematic illustration of an example of a task group of manual tools showing performance results from a task performed multiple times.
Figure 19:
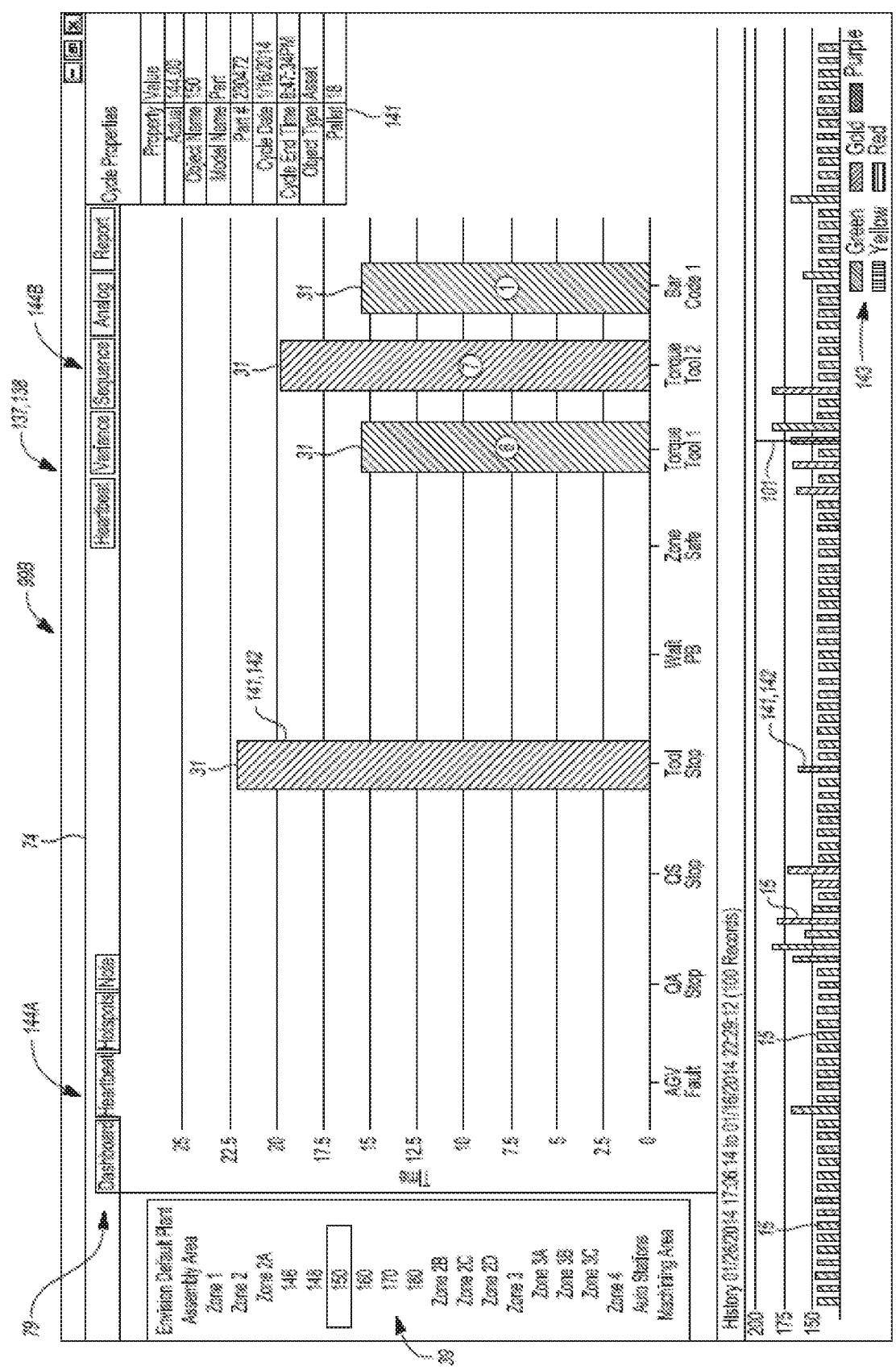
FIG. 19 is a schematic illustration of an example of a heartbeat display of several task groups.
Figure 20:
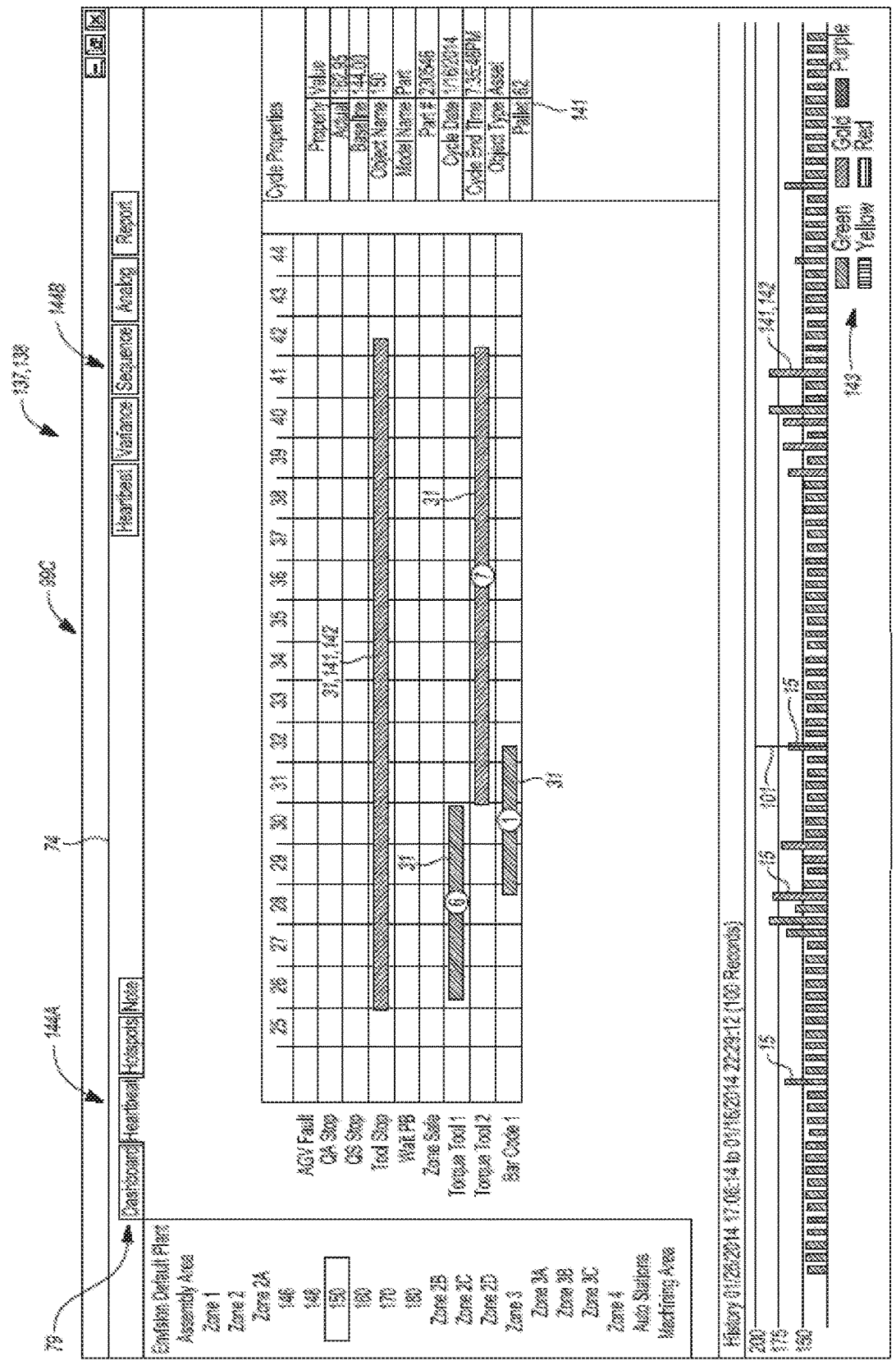
FIG. 20 is a schematic illustration of an example of a sequence of operations (SOP) display of the several task groups of FIG. 19.

Referring now to FIGS. 17-20, an example display template 137 shown as a data populated data display 138 is shown in each of FIGS. 17-20, where each of the data displays 138 shown in FIGS. 17-20 relate to the display of manual tool information, thus advantaging AOS 10 by providing a means to collect, digitize and display output from manual tools used in an enterprise 12. By way of non-limiting example, manual tools can include non-automated tools such as pneumatically controlled torque wrenches used to tighten fasteners within a predetermined torque range on an assembly line, where, because of the non-automated, e.g., manual operation of the torque wrench, operator variability, etc., real time data collection of condition states of the torque wrench operation can be challenging without the AOS 10 and data display methods described here. FIG. 17 shows a data display 138 arranged as a task group entry display 87 to illustrate entry of manual tools into AOS 10 as a task group that performs the same task one or more times. In the illustrative examples shown, entry of three manual tools, a first torque tool 001, a second torque tool 002, and a bar code reader 001 into the AOS 10 for data collection and tracking is shown. The first and second torque tools 001, 002 (not shown) can be pneumatic torque wrenches, in a non-limiting example. FIG. 17 shows a task group entry display 87 displaying a system configuration which includes metadata related to an SOP 39 performed in part using manual tools. The manual tools are, where the display of manual tools in the overall system is dictated by the location metadata. In the example shown in FIG. 17, a "Manual Stations" element is created at 93 and lists the manual tools including a first torque tool 001, a second torque tool 002, and a bar code reader 001. In the example shown and as indicated at 89, first torque tool 001, second torque tool 002, and bar code reader 001 are assigned to station 150 in sub-Zone 2A of Zone 2 in Assembly Area 1 to perform a sequence of tasks including at least one of the torque tools performing the sequence of tasks indicated at 95 in FIG. 17. The task group entry display 87 can include data features 141 such as a digital indicator 101 which can be lighted or otherwise differentiated indicating the entry of a task to the task sequence 95 was successfully received into the system configuration. Other data features 141 can include task parameters 21, 27, which can be start and end times for each of the tasks in the task sequence 95. FIGS. 19 and 20 display the three manual tools in data displays 138 where FIG. 19 shows a manual tool heartbeat display 99B and FIG. 20 shows a manual tool SOP timeline display 99C, where an actual cycle indicator 31 is displayed in each of the displays 99B, 99C showing the actual cycle duration for each of the manual tools to complete an operational cycle. The operational cycle can require a manual tool to perform multiple tasks during the operational cycle, where the number of tasks completed by the tool in the operational cycle can be displayed as a number encircled in the graphical bar displaying the actual cycle indicator 31. For example, the first torque tool 001 performs six (6) tasks, e.g., for example, torques six (6) fasteners, during its operational cycle. Operational data for the task sequence performed, for example, by one of the torque tools 001, can be displayed in a manual tool analog display 99A shown in FIG. 18, where the listed tasks are performed in the order listed.

In one example, differentiated data feature 142, which can be an indicator bar 104, can be sequentially highlighted as each of the tasks is completed in the order 102 during an operational cycle of the torque tool 001. The indicator bar 104 can be further differentiated by being displayed in one of the modes 143 shown in FIG. 18 to indicate a condition state of the task associated with the indicator bar 104. For example, the task started at 7:01:34 PM shows the indicator bar 104A displayed in the "green" mode indicating acceptable completion of the "torque satisfied" step. Indicator bar 104B is displayed in the "purple" mode indicating, for example, the angle was not satisfied and re-torquing of the fastener is required. Indicator bar 104C is displayed in "yellow" mode, which could, for example, indicate the task was rejected and/or an alert was set. The manual tool analog display 99A can further include one or more charts 103 for graphically displaying, in the example shown, data related to the trigger pulled signal and the analog signal produced by the manual tools. A user viewing the manual tool displays 99A, 99B, 99C can toggle between the displays 99 and/or activate the display template 137 to update the displays 99 in real time, by selecting the from the tab groupings 144A, 144B shown in FIGS. 18-20. For example, the user can apply a touch input to the "analog" tab in tab group 144B to view the manual tool analog display 99A in real time, can apply a touch input to the "heartbeat" tab in tab group 144B to view the manual tool heartbeat display 99B in real time, and can apply a touch input to the "sequence" tab in tab group 144B to view the manual tool sequence display 99C in real time.

The AOS 10 is advantaged by accumulating the data and inputs from various elements E, machines 16 and facilities 14, and/or over various operating time periods, and analyzing the accumulated data and inputs using a server, such as a facility server L3 and/or the enterprise server L4, to identify issues, trends, patterns, etc. which may not be identifiable by the machine controllers L2, for example where such issues may result from interactions of multiple inputs which are outside the scope of inputs controlled by or analyzed by any individual one of the machine controllers L2, and/or which may be identifiable only by a combination of inputs from multiple machine 16, multiple time periods such as operating shifts, and/or by a combination of inputs to determine cumulative issues within a production line, a zone 98, a group of common elements E or common machines 16, etc., and using the AOS 10 to identify, action responses to, manage and/or prevent issues using the collective resources of the enterprise 12. The AOS 10 described herein is advantaged by the capability to generate a plurality of differently configured data displays 138 generated from a plurality of corresponding display templates 137 populated with real time data which can be displayed to a user in real time, on a user interface 74 of a user device U, to allow real time monitoring of the operation, machine, etc. defining the data display 138 being viewed by the user. Differentiation of certain data features 142 of the data display 138 provides immediate visual recognition by the user/view of the condition state and/or alert status of a differentiated data feature 142. The differentiated data feature 142 may be visually differentiated, for example, by color, pattern, font, lighting, etc. for efficient viewing. The data display 138 may be activated by a touch input to the touch screen 74 to display additional information, for example, in a pop-up window 61, for convenient and real time viewing by the user/viewer.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

What is claimed is:

1. A system for controlling automation, the system comprising:
a machine including at least one sensor;
wherein the machine performs at least one operation;
wherein the at least one operation is characterized by a baseline cycle time;
the at least one sensor generating data in response to a performance of the operation;
wherein the at least one sensor senses an actual cycle of the at least one operation and generates the data defined by the actual cycle of the at least one operation in real time;
wherein the data defines an actual start time, an actual stop time, and an actual cycle time of the actual cycle;
a data memory storage to receive and store the data generated by the at least one sensor;
a server in communication with the data memory storage;
the server including at least one display template for displaying the data;
the at least one display template including at least one data feature defined by one of the at least one operation or the data;
wherein the at least one data feature of the at least one display template includes:
a sequence of operations (SOP) performed by the machine;
a baseline cycle time indicator for displaying the baseline cycle time of the at least one operation;
an actual cycle time indicator for displaying the actual start time, the actual stop time, and the actual cycle time of the at least one operation;
wherein the actual cycle time indicator is populated with the data generated by the at least one sensor; and
wherein the actual cycle time indicator is differentiated as determined by a comparison of the actual cycle time to the baseline cycle time of the at least one operation;
wherein the at least one display template displays the baseline cycle time indicator of the at least one operation and the actual cycle time indicator of the at least one operation in an SOP timeline display;
wherein the SOP timeline display includes a display of:
a timeline displaying an actual time of day when the sequence of operations is performed;
the sequence of operations including the at least one operation;
wherein the actual cycle time indicator is configured such that the actual start time and the actual stop time are displayed relative to the timeline and the actual time of day;
wherein the at least one display template defines at least one touch activated user interface element (UIE) associated with the at least one data feature;
the at least one data feature having a differentiator for displaying the actual cycle time indicator in a mode which is one of a first mode and at least a second mode;
wherein the mode of the actual cycle time indicator is determined by data populating a data display;
wherein the server is configured to:
generate the data display in real time by:
selecting the at least one display template;
populating the at least one display template with the data generated by the at least one sensor in real time;
and displaying the at least one data feature in the mode of the data feature determined in real time;
generate a display of additional information in real time in response to activation of the UIE;
wherein the display of additional information includes an additional data feature which is different from the at least one data feature;
wherein the additional information is defined by the mode of the at least one data feature;
a user device including a user interface;
wherein the user interface is a touch interface for receiving a touch input to the UIE from a user; and
wherein activating the UIE activates the display template to concurrently display, in the data display, the additional data feature and the at least one data feature in real time.

2. The system of claim 1, wherein the data defined by the performance of the operation includes at least one of a condition state of the operation and an operating parameter of the at least one operation;
wherein the at least one of the condition state and the operating parameter is sensed by the at least one sensor during the performance of the at least one operation.

3. The system of claim 1, wherein the data is associated in the data memory storage with the at least one operation, the machine, and a data time;
wherein the data time associated with the data is one of a time the at least one sensor sensed the data and a time the data was stored to the data memory storage.

4. The system of claim 1, further comprising:
the at least one data feature is a stoppage time feature.

5. The system of claim 1, further comprising:
the at least one data feature is a digitized asset feature.

6. The system of claim 1, wherein:
the at least one data feature comprises the actual cycle time indicator; and
the at least one UIE is associated with the actual cycle time indicator.

7. The system of claim 6, wherein:
the additional data feature displayed by activation of the at least one UIE comprises a condition state of the actual cycle.

8. The system of claim 1, wherein:
the machine comprises at least one station;
the display of additional information comprises a digitized asset display; and
the digitized asset display is defined by the at least one station.

9. The system of claim 8, wherein the digitized asset display comprises a plurality of additional data features defined by the at least one station.

10. The system of claim 8, wherein the additional information displayed by the digitized asset display comprises an asset identifier of the at least one station and a cycle time defined by the at least one station.

11. The system of claim 1, wherein:
the machine comprises a first station and a second station;
the data display comprises:
a first digitized asset display defined by the first station; and
a second digitized asset display defined by the second station;
wherein:
the first digitized asset display comprises an asset identifier of the first station and a cycle time defined by the first station; and
the second digitized asset display comprises an asset identifier of the second station and a cycle time defined by the second station.

12. A method for controlling automation, the method comprising:
performing at least one operation using a machine comprising at least one sensor;
wherein the at least one operation is characterized by a baseline cycle time;
sensing an actual cycle of the at least one operation and generating data defined by the actual cycle of the at least one operation in real time using the at least one sensor;
wherein the data defines an actual start time, an actual stop time, and an actual cycle time of the actual cycle;
receiving and storing the data generated by the at least one sensor to a data memory storage;
generating a data display in real time, using a server in communication with the data memory storage, by:
selecting a display template;
populating the display template with the data generated by the at least one sensor in real time to generate the data display;
wherein the display template comprises at least one data feature defined by one of the at least one operation or the data;
wherein the at least one data feature of the display template includes:
a sequence of operations (SOP) performed by the machine;
a baseline cycle time indicator for displaying the baseline cycle time of the at least one operation;
an actual cycle time indicator for displaying the actual start time, the actual stop time, and the actual cycle time of the at least one operation;
wherein the actual cycle time indicator is populated with the data generated by the at least one sensor; and
wherein the actual cycle time indicator is differentiated as determined by a comparison of the actual cycle time to the baseline cycle time of the at least one operation;

wherein the display template displays the baseline cycle time indicator of the at least one operation and the actual cycle time indicator of the at least one operation in an SOP timeline display;
wherein the SOP timeline display includes a display of:
a timeline displaying an actual time of day when the sequence of operation is performed;
the sequence of operations including the at least one operation;
wherein the actual cycle time indicator is configured such that the actual start time and the actual stop time are displayed relative to the timeline and the actual time of day;
wherein the at least one display template defines at least one touch activated user interface element (UIE) associated with the at least one data feature;
the at least one data feature having a differentiator for displaying the actual cycle time indicator in a mode which is one of a first mode and at least a second mode;
wherein the mode of the actual cycle time indicator is determined by the data;
displaying the data display in real time to a user interface of a user device in communication with the server such that the at least one data feature is displayed in the mode of the at least one data feature determined in real time;
generating a display of additional information in real time in response to activation of the UIE;
wherein the display of additional information includes an additional data feature which is different from the at least one data feature;
wherein the additional information is defined by the mode of the at least one data feature;
wherein the user interface is a touch interface;
receiving, via the touch interface, a touch input applied to the at least one touch activated user input element (UIE) defined by the display template; and
activating the display template via the touch input to the UIE;
wherein activating the display template comprises concurrently displaying the additional data feature and the at least one data feature to the user interface in real time in response to the touch input;
wherein the additional information is defined by the mode of the at least one data feature in real time.

13. The method of claim 12, the method further comprising:
determining a condition state of the data;
selecting one of the first mode and the at least second mode based on the condition state;
and displaying the at least one data feature in the selected one of the first mode and the at least second mode.

* * * * *